(12) United States Patent
Tsuda et al.

(10) Patent No.: US 9,139,198 B2
(45) Date of Patent: Sep. 22, 2015

(54) CONTROL DEVICE FOR VEHICLE DRIVE DEVICE

(71) Applicant: AISIN AW CO., LTD., Anjo (JP)

(72) Inventors: Kohei Tsuda, Nishio (JP); Yoichi Tajima, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/359,529

(22) PCT Filed: Jan. 28, 2013

(86) PCT No.: PCT/JP2013/051763
§ 371 (c)(1),
(2) Date: May 20, 2014

(87) PCT Pub. No.: WO2013/111900
PCT Pub. Date: Aug. 1, 2013

(65) Prior Publication Data
US 2014/0297089 A1   Oct. 2, 2014

(30) Foreign Application Priority Data

Jan. 27, 2012   (JP) ................................. 2012-015973

(51) Int. Cl.
*G06F 17/00*   (2006.01)
*G06F 19/00*   (2011.01)
(Continued)

(52) U.S. Cl.
CPC .................. *B60W 20/30* (2013.01); *B60K 6/48* (2013.01); *B60K 6/547* (2013.01); *B60L 3/106* (2013.01); *B60L 11/14* (2013.01); *B60W 10/02* (2013.01); *B60W 10/06* (2013.01); *B60W 10/10* (2013.01); *B60W 10/115* (2013.01); *B60W 20/00* (2013.01); *B60W 30/19* (2013.01); *F16H 61/02* (2013.01); *F16H 61/686* (2013.01); *F16H 63/50* (2013.01); *B60L 2240/12* (2013.01);
(Continued)

(58) Field of Classification Search
CPC combination set(s) only.
See application file for complete search history.

(56) References Cited

U.S. PATENT DOCUMENTS

2008/0125927 A1* 5/2008 Gohring et al. ................. 701/22
2012/0115676 A1* 5/2012 Schiele et al. .................... 477/5
2013/0296111 A1* 11/2013 Nedorezov et al. ............... 477/5

FOREIGN PATENT DOCUMENTS

| JP | A-2006-306210 | 11/2006 |
| JP | A-2008-207643 | 9/2008 |
| JP | A-2010-111194 | 5/2010 |

OTHER PUBLICATIONS

International Search Report issued in International Patent Application No. PCT/JP2013/051763 dated Mar. 12, 2013.

*Primary Examiner* — Thomas Tarcza
*Assistant Examiner* — Edward Pipala
(74) *Attorney, Agent, or Firm* — Oliff PLC

(57) ABSTRACT

A control device for a vehicle drive device. A start control section executes internal combustion engine start control. A start slip control section executes start slip control of bringing one of the plurality of shift engagement devices into a slip engaged state. An intended engagement device deciding section that decides as an intended engagement device, based on a set determination speed. The intended engagement device deciding section decides as the intended engagement device a special engagement device that is the shift engagement device having been in the direct-coupling engaged state in order to form the reference shift speed, and that is disengaged when a transition is made to a special shift speed on an opposite side of the specific shift speed from the reference shift speed in order of speed ratios of the plurality of shift speeds.

7 Claims, 14 Drawing Sheets

(51) Int. Cl.
*B60W 20/00* (2006.01)
*B60K 6/48* (2007.10)
*B60K 6/547* (2007.10)
*B60L 11/14* (2006.01)
*B60W 10/06* (2006.01)
*B60W 10/10* (2012.01)
*F16H 61/02* (2006.01)
*F16H 61/686* (2006.01)
*F16H 63/50* (2006.01)
*B60W 10/115* (2012.01)
*B60W 30/19* (2012.01)
*B60L 3/10* (2006.01)
*B60W 10/02* (2006.01)

(52) U.S. Cl.
CPC ...... *B60L 2240/423* (2013.01); *B60L 2240/465* (2013.01); *Y02T 10/6221* (2013.01); *Y02T 10/642* (2013.01); *Y02T 10/70* (2013.01); *Y02T 10/7077* (2013.01); *Y10S 903/93* (2013.01)

|  | C1 | C2 | C3 | B1 | B2 |
|---|---|---|---|---|---|
| 1st | ○ |  |  |  | ● |
| 2nd | ○ |  |  | ● |  |
| 3rd | ○ |  | ● |  |  |
| 4th | ○ | ● |  |  |  |
| 5th |  | ◎ | ● |  |  |
| 6th |  | ◎ |  | ● |  |

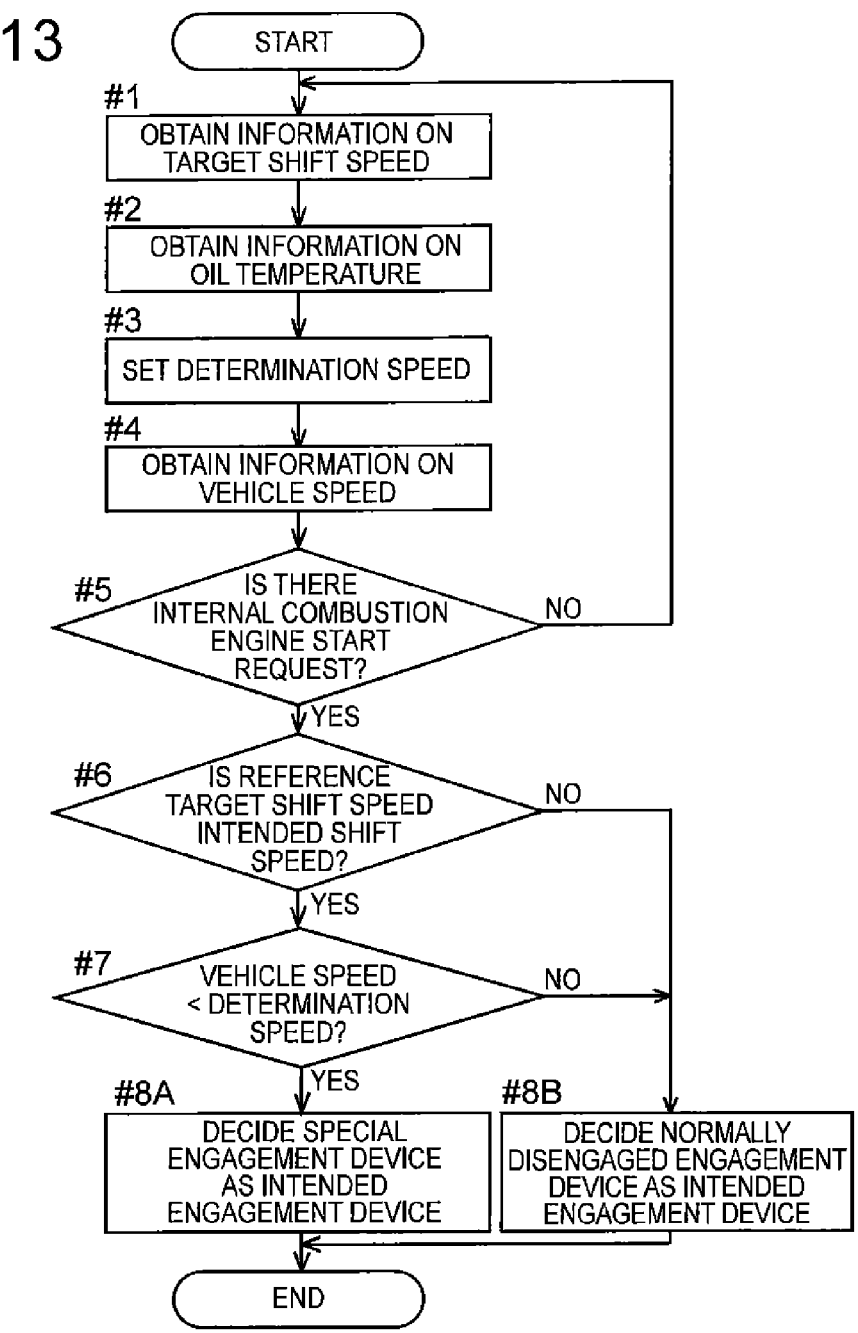

FIG. 15

|     | C1 | C2 | C3 | C4 | B1 | B2 |
|-----|----|----|----|----|----|----|
| 1st | ○  |    |    |    |    | ●  |
| 2nd | ○  |    |    |    | ●  |    |
| 3rd | ○  |    | ●  |    |    |    |
| 4th | ○  |    |    | ●  |    |    |
| 5th | ○  | ●  |    |    |    |    |
| 6th |    | ◎  |    | ●  |    |    |
| 7th |    | ◎  | ●  |    |    |    |
| 8th |    | ◎  |    |    | ●  |    |

CONTROL DEVICE FOR VEHICLE DRIVE DEVICE

TECHNICAL FIELD

The present invention relates to control devices that control a vehicle drive device in which a disconnecting engagement device, a rotating electrical machine, and a speed change mechanism are provided in this order from an internal combustion engine toward wheels on a power transmission path connecting the internal combustion engine and the wheels.

BACKGROUND ART

A device described in Japanese Patent Application Publication No. 2008-207643 (JP 2008-207643 A) (Patent Document 1) is already known as such a control device that controls a vehicle drive device as described above. The names of members in Patent Document 1 that correspond to members in the present invention are referred to in parentheses "[ ]" in the description of this section "BACKGROUND ART." In this control device, one of a plurality of shift engagement devices [fastening elements] included in the speed change mechanism [automatic transmission AT] is brought into a slip engaged state upon a change from EV mode to HEV mode. In this state, the disconnecting engagement device [start clutch CL1] is engaged, and the rotational speed of the rotating electrical machine [motor-generator MG] is increased to crank the internal combustion engine [engine E]. Such slip of the predetermined shift engagement device reduces start shock due to unstable torque during this period being transferred to the wheels.

As also recognized in Patent Document 1, a target shift speed in the speed change mechanism is sometimes changed in the mode switching operation involving starting of the internal combustion engine. For example, in the case where a large driving force is required in order to drive a vehicle, starting of the internal combustion engine and downshift (change to a shift speed with a relatively high speed ratio) are sometimes requested. Taking such a case into consideration, the control device of Patent Document 1 slips the shift engagement device, which is disengaged when shifting from a shift speed that has been formed at the time the internal combustion engine start control is started to a shift speed adjoining this shift speed, as the "predetermined shift engagement device" described above. Slip control for reducing start shock and slip control for shifting is thus performed by common control. Accordingly, even if an internal combustion engine start control request and a shift request are received at the same time, each control can be smoothly executed.

An actual rotational speed of an input-side rotating member in the speed change mechanism increases with the internal combustion engine start control. This increase in actual rotational speed can be regarded as being about the same regardless of the vehicle speed or the shift speed. On the other hand, a virtual increase in synchronous rotational speed due to the change in shift speed is determined proportionally to the vehicle speed according to the speed ratio of each shift speed as well. Accordingly, depending on the vehicle speed, the rotational speed of the input-side rotating member which increases with the internal combustion engine start control exceeds a synchronous rotational speed at the changed shift speed (the degree of progress in shifting reaches 100%). As a result, the shift control is immediately terminated, and subsequently the rotational speed of the input-side rotating member decreases (see FIG. 16 of the present application), whereby comfortable traveling performance may not be ensured. It is not impossible to suppress the increase in rotational speed of the input-side rotating member by adjusting an oil pressure to be supplied to the shift engagement device to be slipped (see FIG. 17 of the present application). In this case, however, the torque that is transferred to the wheels rapidly increases accordingly, whereby comfortable traveling performance may not be ensured.

RELATED ART DOCUMENT

Patent Document

[Patent Document 1] Japanese Patent Application Publication No. 2008-207643 (JP 2008-207643 A)

SUMMARY OF THE INVENTION

Problem to be Solved by the Invention

It is therefore desired to implement a control device for a vehicle drive device which is capable of smoothly executing each control while ensuring comfortable traveling performance regardless of the vehicle speed when internal combustion engine start control and shift control are executed at the same time.

Means for Solving the Problem

According to the present invention, a control device for a vehicle drive device in which a disconnecting engagement device, a rotating electrical machine, and a speed change mechanism are provided in this order from an internal combustion engine toward wheels on a power transmission path connecting the internal combustion engine and the wheels, and in which the speed change mechanism is capable of switching between or among a plurality of shift speeds by controlling an engagement state of each of a plurality of shift engagement devices included in the speed change mechanism, characterized by including: a start control section that executes internal combustion engine start control of bringing the disconnecting engagement device from a disengaged state to a direct-coupling engaged state and starting the internal combustion engine in a stopped state; a start slip control section that executes start slip control of bringing one of the plurality of shift engagement devices into a slip engaged state at least when the disconnecting engagement device is direct-coupling engaged in the internal combustion engine start control; and an intended engagement device deciding section that decides as an intended engagement device the shift engagement device to be brought into the slip engaged state in the start slip control. In the control device, the intended engagement device deciding section operates based on a set determination speed so that when a vehicle speed is equal to or higher than the determination speed, the intended engagement device deciding section decides as the intended engagement device a normally disengaged engagement device that is the shift engagement device having been in the direct-coupling engaged state in order to form a reference shift speed at a time the start slip control is started, and that is disengaged when a transition is made from the reference shift speed to a predetermined specific shift speed, and when the vehicle speed is lower than the determination speed, the intended engagement device deciding section decides as the intended engagement device a special engagement device that is the shift engagement device having been in the direct-coupling engaged state in order to form the reference shift speed, and that is disengaged when a transition is made to a special shift speed on an opposite side of the specific shift speed from the reference shift speed in order of speed ratios of the plurality of shift speeds.

The expression "disengaged state" means that neither rotation nor torque is transferred between two engagement members that are engaged by an intended engagement device. This "disengaged state" includes the state where the engagement device is controlled to be in a non-engaged state, but rotation and torque are unintentionally transferred by drag between the two engagement members. The expression "slip engaged state" means the state where the two engagement members are engaged with a differential rotational speed therebetween so as to be able to transfer torque therebetween. The expression "direct-coupling engaged state" means the state where the two engagement members are engaged so as to rotate together.

According to this characteristic configuration, the shift engagement device to be brought into the slip engaged state in the start slip control (the intended engagement device) can be appropriately decided according to the relation between the vehicle and the determination speed. That is, when the vehicle speed is equal to or higher than the determination speed, there is often a margin up to the end point of the shifting to the specific shift speed even if the shifting proceeds with the internal combustion engine start control. Accordingly, in this case, the normally disengaged engagement device is used as the intended engagement device as in conventional examples. On the other hand, when the vehicle speed is lower than the determination speed, the special engagement device rather than the normally disengaged engagement device is used as the intended engagement device. This special engagement device is the shift engagement device that is disengaged when a transition is made to the special shift speed on the opposite side of the specific shift speed from the reference shift speed in the order of the speed ratios. Using the special engagement device as the intended engagement device allows for a certain amount of margin up to the end point of the shifting to the special shift speed after the shifting proceeds with the internal combustion engine start control, even if the vehicle speed is relatively low. In either case, this can avoid immediate termination of the shift control after starting of the internal combustion engine, and comfortable traveling performance can be ensured. Moreover, in either case, slip control for reducing start shock and slip control for shifting to the specific shift speed or the special shift speed can be executed by common control, whereby both the internal combustion engine start control and the shift control can be smoothly and quickly executed.

It is preferable that the intended engagement device deciding section set the determination speed to different values according to which one of the plurality of shift speeds is the reference shift speed.

The degree of progress of the shifting associated with the internal combustion engine start control depends not only on the vehicle speed but also on the shift speed at the time the internal combustion engine start control and the start slip control are started. According to this configuration, based on the determination speed that is appropriately set according to which one of the plurality of shift speeds is the reference shift speed, the intended engagement device can be appropriately decided according to the relation between the determination speed and the vehicle speed.

It is preferable that a rotational speed of an input-side rotating member of the speed change mechanism which is determined according to the vehicle speed and the shift speed be a synchronous rotational speed, and the intended engagement device deciding section set the determination speed based on a difference between a reference synchronous rotational speed as the synchronous rotational speed at the reference shift speed and a specific synchronous rotational speed as the synchronous rotational speed at the specific shift speed, and a predetermined determination differential rotational speed.

According to this configuration, the determination speed can be set so that the difference between the reference synchronous rotational speed and the specific synchronous rotational speed is equal to or larger than the predetermined determination differential rotational speed. Thus, when the vehicle speed is equal to or higher than the determination speed, the differential rotational speed equal to or higher than the determination differential rotational speed can be ensured between the reference synchronous rotational speed and the specific synchronous rotational speed at that vehicle speed. When the vehicle speed is lower than the determination speed, the differential rotational speed between the reference synchronous rotational speed and the specific synchronous rotational speed at that vehicle speed can be lower than the determination differential rotational speed, but a differential rotational speed equal to or higher than the determination differential rotational speed can be easily ensured between the reference synchronous rotational speed and the synchronous rotational speed at the special shift speed. Accordingly, even if the rotational speed of the input-side rotating member of the speed change mechanism increases with the internal combustion engine start control, a certain amount of margin can be ensured up to the point when the rotational speed of the input-side rotating member reaches the synchronous rotational speed at a predetermined shift speed (the specific shift speed or the special shift speed depending on the vehicle speed). Accordingly, comfortable traveling performance can be effectively implemented. The expression "input-side rotating member of the speed change mechanism" refers to the rotating member located closest to the internal combustion engine along the power transmission path in the speed change mechanism.

It is preferable that the determination differential rotational speed be set based on an increase in the rotational speed of the input-side rotating member from the reference synchronous rotational speed which is associated with the internal combustion engine start control and a margin predetermined in view of responsiveness of the shift engagement device when a transition is made from the reference shift speed to the specific shift speed.

With the internal combustion engine start control, the rotational speed of the input-side rotating member of the speed change mechanism increases from the reference synchronous rotational speed due to an active factor that is caused by the control device and a passive factor that is caused by the start of self-sustained operation of the internal combustion engine. In general, in control of the engagement devices, a certain amount of control delay is inevitable in view of the realities. Accordingly, when a transition is made from the reference shift speed to the specific shift speed, the rotational speed of the input-side rotating member may further increase according to the control delay of the shift engagement device to be brought from the disengaged state to the direct-coupling engaged state. In view of this, according to the above configuration, the determination differential rotational speed can be appropriately decided based on the increase in rotational speed of the input-side rotating member which is associated with the internal combustion engine start control, and the margin in view of responsiveness of the shift engagement device.

It is preferable that the margin be set according to rotation acceleration of the internal combustion engine after starting of the internal combustion engine is started.

In the state where the rotational speed of the internal combustion engine further increases beyond the reference synchronous rotational speed, the internal combustion engine and the input-side rotating member of the speed change mechanism can be regarded as rotating synchronously with each other. Moreover, the control delay time of the normally disengaged engagement device can be decided quantitatively to some extent. In view of this, according to the above configuration, the margin in view of responsiveness of the shift engagement device can be appropriately set based also on the control delay time according to the rotation acceleration of the internal combustion engine that rotates synchronously with the input-side rotating member.

It is preferable that the shift engagement device be a hydraulically driven engagement device, and the intended engagement device deciding section set the determination speed to different values according to an oil temperature at the start of the start slip control.

In the case where the shift engagement device is a hydraulically driven engagement device, responsiveness of the shift engagement device depends on the oil temperature. Accordingly, the degree of progress in shifting associated with the internal combustion engine start control depends not only on the vehicle speed but also on the oil temperature at the time the internal combustion engine start control and the start slip control are started. According to this configuration, the intended engagement device can be appropriately decided according to the relation between the determination speed and the vehicle speed, based on the determination speed that is appropriately set according to the oil pressure.

It is preferable that the speed change mechanism be capable of switching among a first shift speed that is formed by bringing at least a first engagement device and a second engagement device into the direct-coupling engaged state, a second shift speed that is formed by bringing at least the first engagement device and a third engagement device into the direct-coupling engagement state and that is a shift speed lower than the first shift speed, and a third shift speed that is formed by bringing at least the second engagement device and the third engagement device or a fourth engagement device into the direct coupling engagement state and that is a shift speed lower than the second shift speed, and the reference shift speed be the first shift speed, the specific shift speed be the second shift speed, the normally disengaged engagement device be the second engagement device, and the special engagement device be the first engagement device.

According to this configuration, the present invention can be satisfactorily applied to vehicle drive devices including the speed change mechanism capable of switching among the first shift speed, the second shift speed, and the third shift speed in this order from a high shift speed toward a low shift speed.

It is preferable that the specific shift speed be an adjoining shift speed adjoining the reference shift speed on a low shift speed side.

The difference in speed ratio is small between the reference shift speed and the adjoining shift speed, and the possibility that comfortable traveling performance may not be ensured is relatively high depending on the vehicle speed. In view of this, the present invention is particularly suitable for the configuration in which the specific shift speed is the adjoining shift speed as described above.

BRIEF DESCRIPTION OF THE DRAWINGS

FIG. 13 is a flowchart showing procedures of the intended engagement device deciding process.

FIG. 14 shows an operation table of the speed change mechanism in another embodiment.

FIG. 15 shows an operation table of the speed change mechanism in still another embodiment.

MODES FOR CARRYING OUT THE INVENTION

Figure 1:
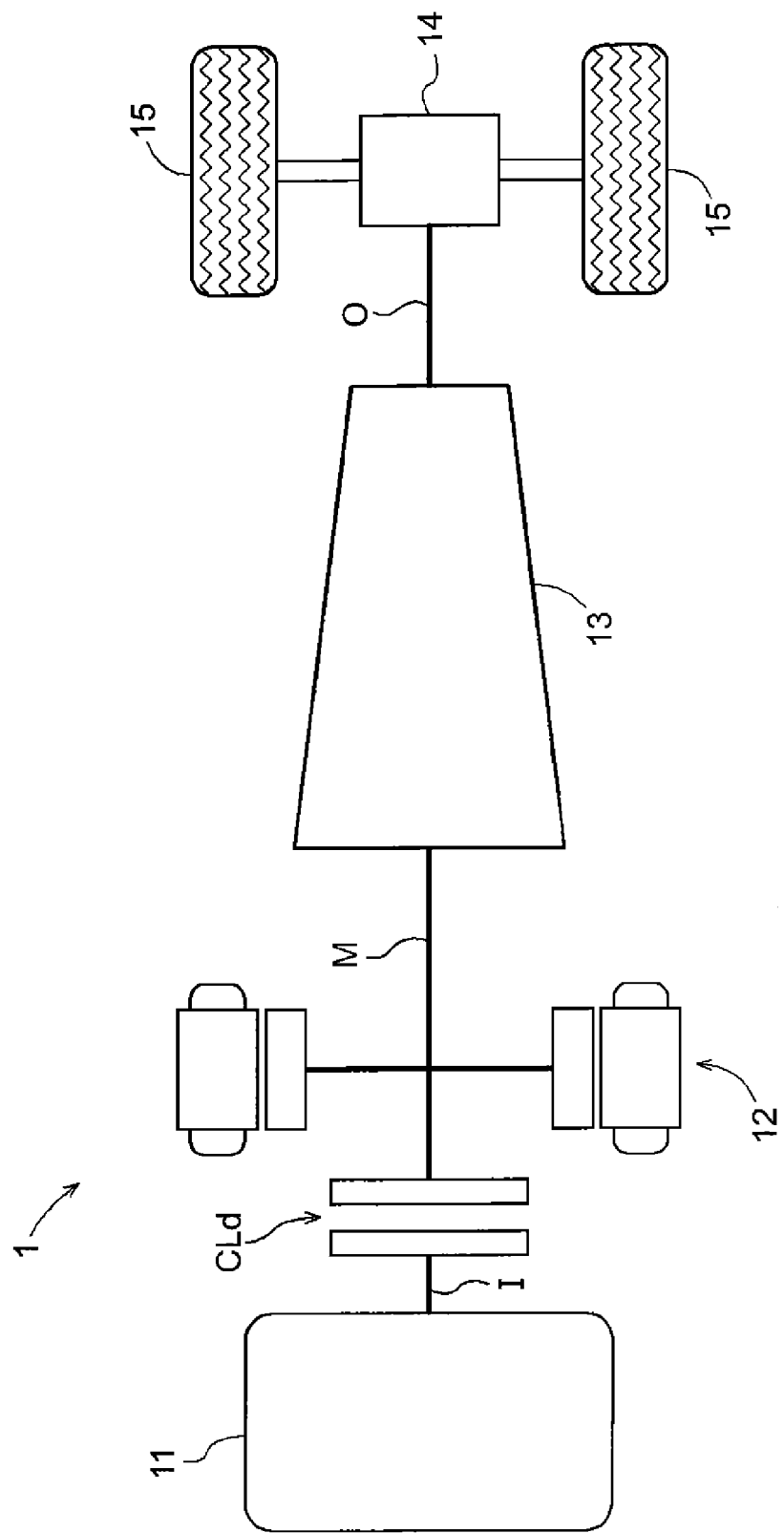
FIG. 1 is a schematic diagram showing a general configuration of a vehicle drive device.

Embodiments of a control device for a vehicle drive device according to the present invention will be described with reference to the accompanying drawings. A control device 3 according to the present embodiment controls a drive device 1. The drive device 1 is a vehicle drive device (hybrid vehicle drive device) that drives a vehicle (hybrid vehicle) including both an internal combustion engine 11 and a rotating electrical machine 12 as driving force sources of wheels 15. The control device 3 according to the present embodiment will be described in detail below.

In the following description, the expression "drivingly coupled" means the state where two rotating members are coupled together so as to be able to transmit a driving force (synonymous with "torque") therebetween, and is used as a concept including the state where the two rotating members are coupled together so as to rotate together, or the state where the two rotating members are coupled together so as to be able to transmit a driving force therebetween via one or more transmission members (a shaft, a gear mechanism, a belt, etc.).

The "engagement pressure" represents the pressure that presses two engagement members, which are engaged in an engagement device, against each other. The "disengagement pressure" represents the pressure at which the engagement device is steadily in a disengaged state (the state where the engagement device is disengaged). The "disengagement boundary pressure" represents the pressure (disengagement-side slip boundary pressure) at which the engagement device is in a boundary state between the disengaged state and a slip engaged state (the state where the engagement device is slip engaged). The "engagement boundary pressure" represents the pressure (engagement-side slip boundary pressure) at which the engagement device is in a boundary state between the slip engaged state and a direct-coupling engaged state (the state where the engagement device is direct-coupling engaged). The "full engagement pressure" represents the pressure at which the engagement device is steadily in the direct-coupling engaged state.

1. Configuration of Drive Device

The configuration of the drive device 1 that is controlled by the control device 3 will be described. As shown in FIG. 1, the drive device 1 according to the present embodiment includes the rotating electrical machine 12 on a power transmission path connecting the internal combustion engine 11 and the wheels 15, includes a disconnecting engagement device CLd between the internal combustion engine 11 and the rotating electrical machine 12, and includes a speed change mechanism 13 between the rotating electrical machine 12 and the wheels 15. That is, the drive device 1 includes the disconnecting engagement device CLd, the rotating electrical machine 12, and the speed change mechanism 13 in this order from the internal combustion engine 11 toward the wheels 15 on the power transmission path connecting the internal combustion engine 11 and the wheels 15. These components are accommodated in a drive device case (not shown).

The internal combustion engine 11 is a motor (gasoline engine etc.) that is driven by fuel combustion in the engine to output power. The internal combustion engine 11 is drivingly coupled to an input shaft I as an input member of the drive device 1. In this example, an internal-combustion-engine output shaft such as a crankshaft of the internal combustion engine 11 is drivingly coupled to the input shaft I so as to rotate together therewith. The internal combustion engine 11 is drivingly coupled to the rotating electrical machine 12 via the disconnecting engagement device CLd.

The disconnecting engagement device CLd is an engagement device that selectively drivingly couples the internal combustion engine 11 and the rotating electrical machine 12. The disconnecting engagement device CLd is capable of releasing driving coupling between the internal combustion engine 11 and the rotating electrical machine 12 when it is in a disengaged state. The disconnecting engagement device CLd functions as an internal-combustion-engine disconnecting engagement device that separates the internal combustion engine 11 from the wheels 15, the rotating electrical machine 12, etc. A wet multi-plate clutch, a dry single-plate clutch, etc. can be used as the disconnecting engagement device CLd. The disconnecting engagement device CLd is configured as a friction engagement device capable of transferring torque by a frictional force generated between engagement members that are engaged with each other.

The rotating electrical machine 12 has a rotor and a stator (not shown), and is capable of functioning both as a motor (electric motor) and as a generator (electric generator). The rotor of the rotating electrical machine 12 is drivingly coupled to a shift input shaft M so as to rotate together therewith. The rotating electrical machine 12 is electrically connected to an electricity storage device 25 (a battery, a capacitor, etc.) via an inverter device 24 (see FIG. 4). The rotating electrical machine 12 is supplied with electric power from the electricity storage device 25 to perform power running, or supplies electric power generated by torque of the internal combustion engine 11, etc. to the electricity storage device 25 to store the electric power therein. The shift input shaft M is a rotating member drivingly coupled to the speed change mechanism 13 and located closest to the internal combustion engine 11 along the power transmission path in the speed change mechanism 13. In the present embodiment, the shift input shaft M corresponds to the "input-side rotating member" in the present invention.

Figures 2, 3:
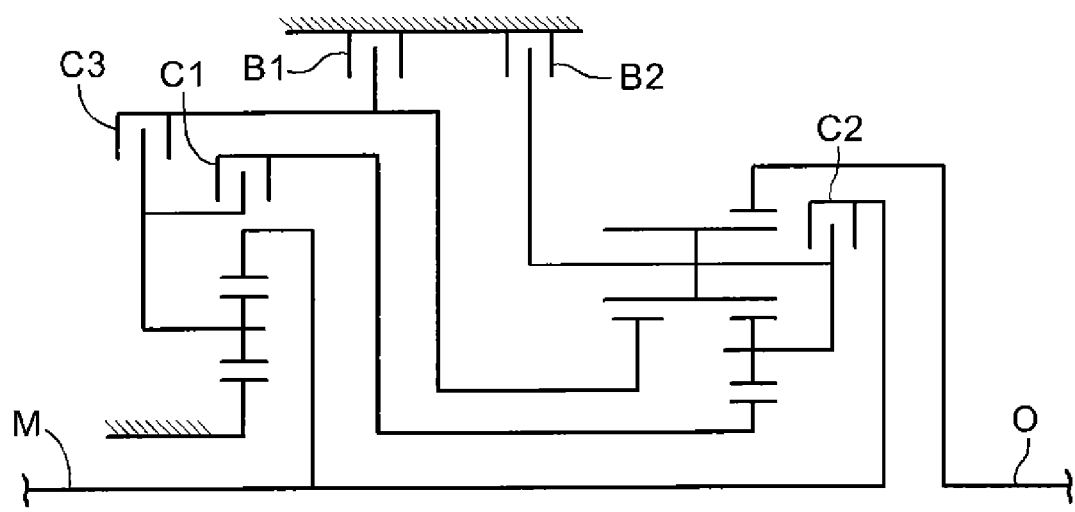
FIG. 2 is a schematic diagram showing the internal configuration of a speed change mechanism.
FIG. 3 shows an operation table of the speed change mechanism.

In the present embodiment, the speed change mechanism 13 is an automatic stepped speed change mechanism having a plurality of switchable shift speeds with different speed ratios (gear ratios). In order to form the plurality of shift speeds, the speed change mechanism 13 includes a gear mechanism and a plurality of shift engagement devices (a first clutch C1, a first brake B1, . . . ) that engage or disengage rotating elements of the gear mechanism, as shown in FIG. 2 as an example. Each of the shift engagement devices is configured as a friction engagement device (a wet multi-plate clutch, a wet multi-plate brake, etc.). Each of the shift engagement devices is configured as a hydraulically driven engagement device including a hydraulic servo mechanism that operates according to an oil pressure supplied thereto.

In the present embodiment, the speed change mechanism 13 forms a target shift speed at each point of time by bringing specific two of the plurality of shift engagement devices into a direct-coupling engaged state and the other shift engagement devices into a disengaged state. In the speed change mechanism 13 of this example, as shown in the engagement table of FIG. 3, a first speed is formed by bringing the first clutch C1 and a second brake B2 into the direct-coupling engaged state, and a second speed is formed by bringing the first clutch C1 and the first brake B1 into the direct-coupling engaged state. The other shift speeds are formed similarly. The speed change mechanism 13 is thus capable of switching between or among the plurality of (in this example, 6) shift speeds by controlling the engagement state of each of the plurality of shift engagement devices (C1, B1, . . . ). The speed change mechanism 13 may form a target shift speed by bringing specific three or more of the plurality of shift engagement devices into the direct-coupling engaged state.

The speed change mechanism 13 shifts the rotational speed of the shift input shaft M based on the speed ratio that has been set for the shift speed to be formed, and transmits the shifted rotational speed to an output shaft O. As used herein, the "speed ratio" is a ratio of the rotational speed of the shift input shaft M to the rotational speed of the output shaft O as an output-side rotating member of the speed change mechanism 13. In the present embodiment, the speed ratio of each shift speed is set so as to decrease in stages from the first speed toward the sixth speed. In the present embodiment, the first speed side with a relatively high speed ratio is referred to as the "low shift speed side," and the sixth speed side with a relatively low speed ratio is referred to as the "high shift speed side."

The output shaft O that also serves as an output member of the drive device 1 is drivingly coupled to the right and left two wheels 15 via a differential gear unit 14. Torque transferred to the output shaft O is distributed and transferred to the two wheels 15 by the differential gear unit 14. The drive device 1 can thus transfer the torque of one or both of the internal combustion engine 11 and the rotating electrical machine 12 to the wheels 15 to move the vehicle.

2. Configuration of Control Device

Figure 4:
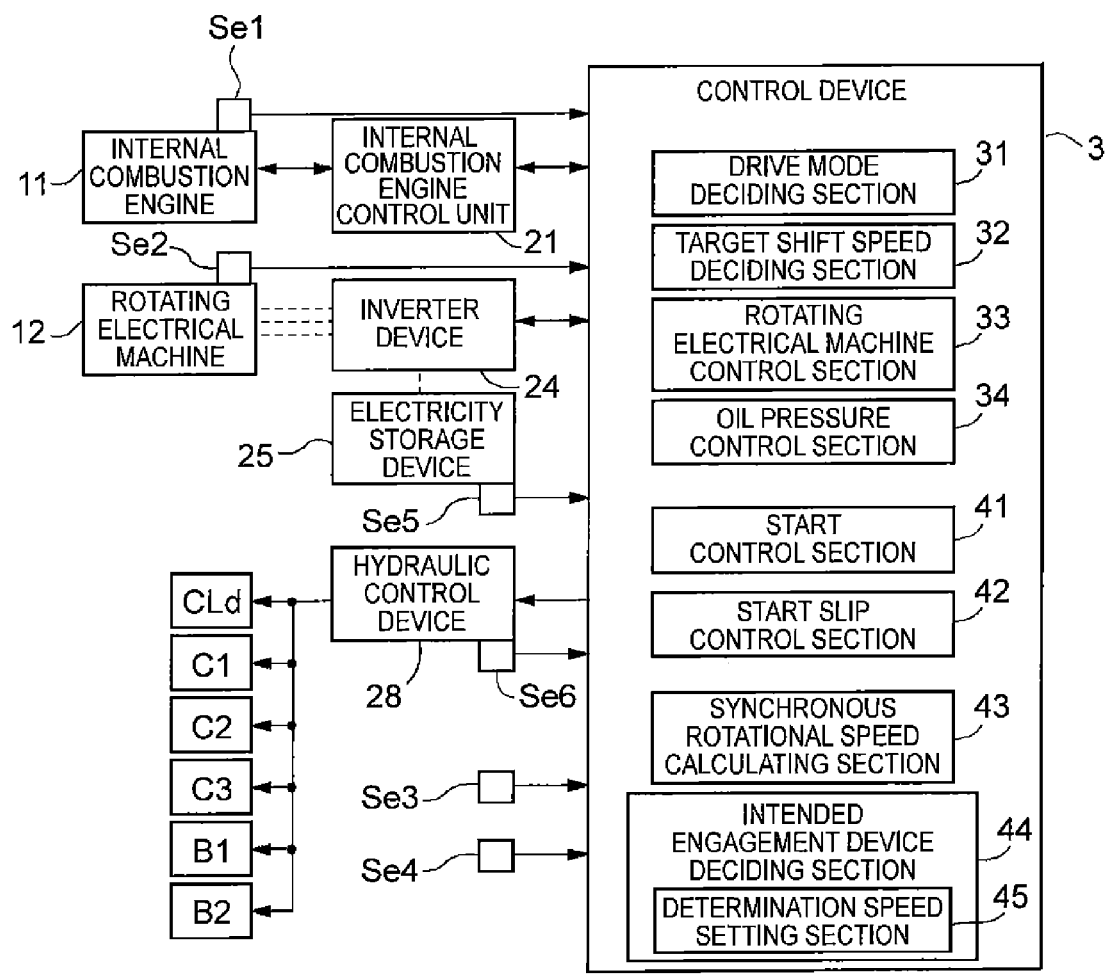
FIG. 4 is a block diagram showing a general configuration of a control device.

The configuration of the control device 3 according to the present embodiment will be described. As shown in FIG. 4, the control device 3 according to the present embodiment includes a plurality of function units, and mainly controls the rotating electrical machine 12, the disconnecting engagement device CLd, and the shift engagement devices (C1, B1, ... ). The plurality of function units are capable of receiving and sending information from and to each other. The control device 3 is also capable of receiving and sending information from and to an internal combustion engine control unit 21 that controls the internal combustion engine 11. The control device 3 is capable of obtaining information on the detection results of sensors Se1 to Se6 provided in each part of the vehicle.

The first rotation sensor Se1 is a sensor that detects the rotational speed of the internal combustion engine 11 (input shaft I). The control device 3 is capable of deriving rotation acceleration of the internal combustion engine 11 based on the detection result of the first rotation sensor Se1. The second rotation sensor Se2 is a sensor that detects the rotational speed of the rotor (shift input shaft M) of the rotating electrical machine 12. The third rotation sensor Se3 is a sensor that detects the rotational speed of the output shaft O. The control device 3 is capable of deriving the rotational speed of the wheels 15 and the vehicle speed based on the detection result of the third rotation sensor Se3. The accelerator operation amount sensor Se4 is a sensor that detects the accelerator operation amount. The state-of-charge detection sensor Se5 is a sensor that detects the state of charge (SOC). The control device 3 is capable of deriving the amount of electricity stored in the electricity storage device 25, based on the detection result of the state-of-charge detection sensor Se5. The oil temperature sensor Se6 is a sensor that detects the temperature of oil (oil temperature) that is supplied to the hydraulic servo mechanism of each engagement device.

The internal combustion engine control unit 21 controls the internal combustion engine 11. The internal combustion engine control unit 21 decides target torque and a target rotational speed of the internal combustion engine 11 and controls operation of the internal combustion engine 11 according to these control targets. In the present embodiment, the internal combustion engine control unit 21 is capable of switching between torque control and rotational speed control of the internal combustion engine 11 according to the traveling state of the vehicle. The torque control is the control of sending a command of target torque to the internal combustion engine 11 to cause the torque of the internal combustion engine 11 to follow the target torque. The rotational speed control is the control of sending a command of a target rotational speed to the internal combustion engine 11 and deciding torque so as to cause the rotational speed of the internal combustion engine 11 to be closer to the target rotational speed.

A drive mode deciding section 31 is a function unit that decides the drive mode of the vehicle. The drive mode deciding section 31 refers to, e.g., a mode selection map (not shown) and decides the drive mode to be implemented by the drive device 1 based on the vehicle speed, the accelerator operation amount, the amount of electricity stored in the electricity storage device 25, etc. In the present embodiment, the drive modes that can be selected by the drive mode deciding section 31 include an electric drive mode (EV mode) and a hybrid drive mode (HEV mode). In the electric drive mode, the disconnecting engagement device CLd is in the disengaged state, and the torque of the rotating electrical machine 12 is transferred to the wheels 15 to move the vehicle. In the hybrid drive mode, the disconnecting engagement device CLd is in the direct-coupling engaged state, and the torque of both the internal combustion engine 11 and the rotating electrical machine 12 is transferred to the wheels 15 to move the vehicle. The present embodiment may be configured so that drive modes other than the above drive modes can be selected.

A target shift speed deciding section 32 is a function unit that decides a target shift speed. The target shift speed deciding section 32 refers to, e.g., a shift map (not shown) and decides a target shift speed to be formed by the speed change mechanism 13 based on the vehicle speed, the accelerator operation amount, etc. In the present embodiment, the target shift speed deciding section 32 decides as the target shift speed a specific one shift speed selected from the first to sixth speeds.

A rotating electrical machine control section 33 is a function unit that controls the rotating electrical machine 12. The rotating electrical machine control section 33 decides target torque and a target rotational speed of the rotating electrical machine 12 and controls operation of the rotating electrical machine 12 according to these control targets. In the present embodiment, the rotating electrical machine control section 33 is capable of switching between torque control and rotational speed control of the rotating electrical machine 12 according to the traveling state of the vehicle. The torque control is the control of sending a command of target torque to the rotating electrical machine 12 to cause the torque of the rotating electrical machine 12 to follow the target torque. The rotational speed control is the control of sending a command of a target rotational speed to the rotating electrical machine 12 and deciding torque so as to cause the rotational speed of the rotating electrical machine 12 to be closer to the target rotational speed.

An oil pressure control section 34 is a function unit that controls supply of an oil pressure to each engagement device (CLd, C1, B1, ... ). The oil pressure control section 34 outputs an oil pressure command for each engagement device according to the decided drive mode, target shift speed, etc., and controls an oil pressure to be supplied to each engagement device via a hydraulic control device 28. The oil pressure control section 34 is capable of continuously controlling the oil pressure to be supplied to each engagement device by a proportional solenoid etc. according to the oil pressure command. An increase or decrease in engagement pressure of each engagement device is thus continuously controlled to control the engagement state of each engagement device. For example, the oil pressure control section 34 brings an intended one of the engagement devices into the disengaged state by controlling the oil pressure to be supplied to the intended engagement device to a value less than the disengagement boundary pressure. The oil pressure control section 34 brings an intended one of the engagement devices into the direct-coupling engaged state by controlling the oil pressure to be supplied to the intended engagement device to a value equal to or higher than the engagement boundary pressure. The oil pressure control section 34 brings an intended one of the engagement devices into the slip engaged state by controlling the oil pressure to be supplied to the intended engagement device to a slip engagement pressure that is equal to or higher than the disengagement boundary pressure and less than the engagement boundary pressure. When the engagement device is in the slip engaged state, two engagement members rotate relative to each other, and torque is transferred from the engagement member having a higher rotational speed toward the engagement member having a lower rotational speed.

A start control section 41 is a function unit that executes internal combustion engine start control. The start control section 41 cooperatively controls the rotating electrical machine control section 33 and the oil pressure control section 34 to execute the internal combustion engine start control. The start control section 41 starts the internal combustion engine start control when internal combustion engine start conditions are satisfied during traveling in, e.g., the electric drive mode. The internal combustion engine start conditions are conditions for starting the internal combustion engine 11 in a stopped state, and are satisfied when the situation arises in which the vehicle requires the torque of the internal combustion engine 11. For example, the internal combustion engine start conditions are satisfied when the vehicle is brought into such a state that the torque required to drive the vehicle cannot be obtained only by the torque of the rotating electrical machine 12 during traveling in the electric drive mode, etc.

Figure 8:
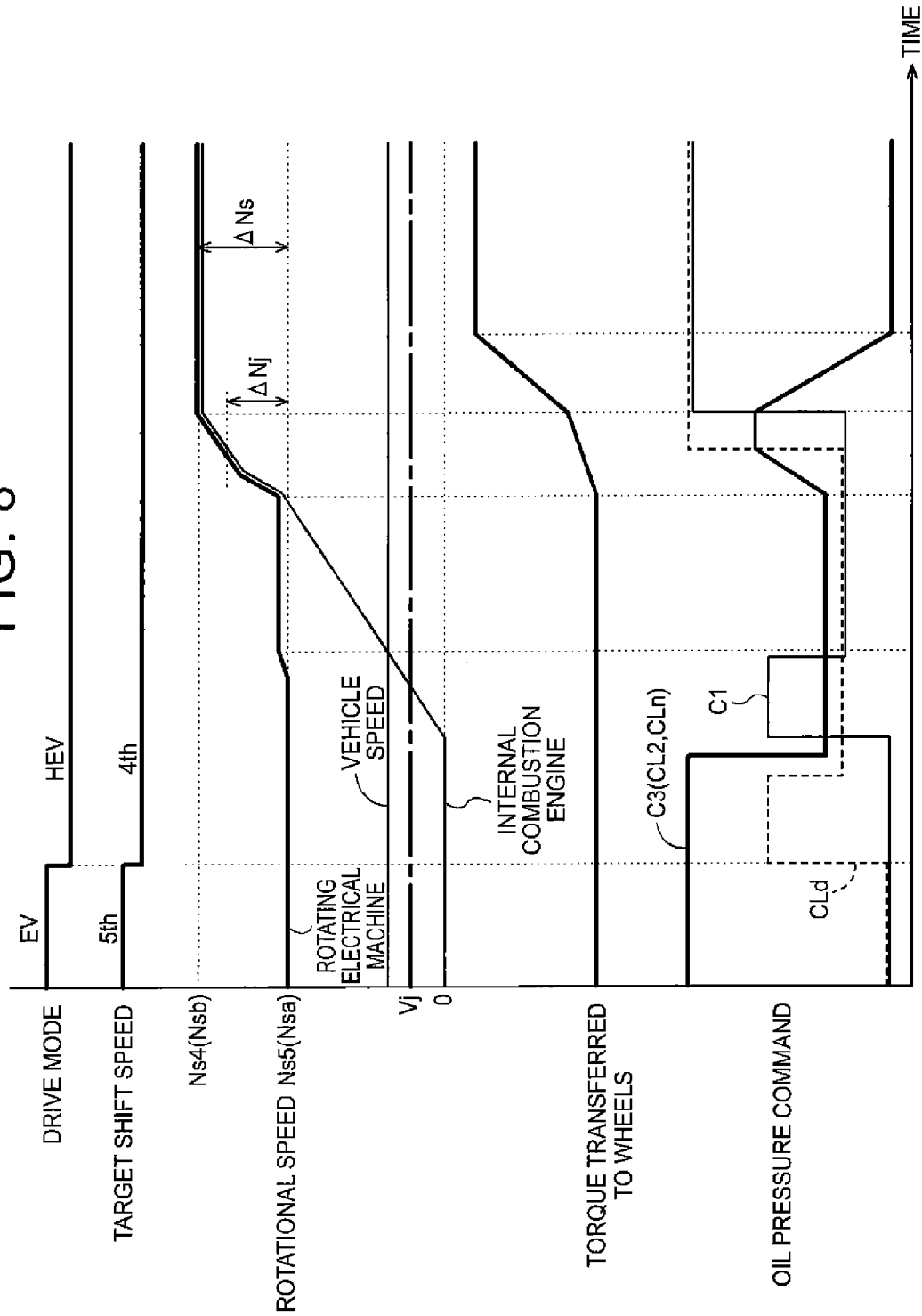
FIG. 8 is a timing chart showing an example of the operating state of each part according to an intended engagement device deciding process.

In the internal combustion engine start control, the start control section 41 controls the oil pressure to be supplied to the disconnecting engagement device CLd to bring the disconnecting engagement device CLd from the disengaged state eventually into the direct-coupling engaged state via the slip engaged state, as also shown in FIG. 8 etc. In parallel with the internal combustion engine start control, the start control section 41 executes the rotational speed control of the rotating electrical machine 12, and starts the internal combustion engine 11 in the stopped state by the torque of the rotating electrical machine 12 which is transferred via the disconnecting engagement device CLd in the slip engaged state. The start control section 41 thus executes the internal combustion engine start control to shift the disconnecting engagement device CLd from the disengaged state to the slip engaged state or the direct-coupling engaged state and to start the internal combustion engine 11 in the stopped state.

A start slip control section 42 is a function unit that executes start slip control in the internal combustion engine start control. The start slip control section 42 executes the start slip control by controlling the oil pressure control section 34. The start slip control section 42 controls the oil pressure to be supplied to one (intended engagement device CLo described below) of the plurality of shift engagement devices to bring the intended engagement device CLo into the slip engaged state from the direct-coupling engaged state. The start slip control section 42 brings the intended engagement device CLo into the slip engaged state at a predetermined point of time while the disconnecting engagement device CLd is in the slip engaged state or the direct-coupling engaged state. In this example, the start slip control section 42 brings the intended engagement device CLo into the slip engaged state at least when the disconnecting engagement device CLd is brought into the direct-coupling engaged state. The rotational speed control of the rotating electrical machine 12 in the internal combustion engine start control can be appropriately executed by such slip control of the intended engagement device CLo. Such slip control of the intended engagement device CLo can also reduce start shock due to transfer of unstable torque associated with starting of the internal combustion engine 11 to the wheels 15.

In such a configuration, the control device 3 according to the present embodiment is characterized by deciding the intended engagement device CLo to be brought into the slip engaged state in the start slip control, based on the vehicle speed as a traveling speed of the vehicle having both the drive device 1 and the control device 3 mounted thereon and a set determination speed Vj. This will be described in detail below with respect to two assumed examples.

First Assumed Example

Figure 7:
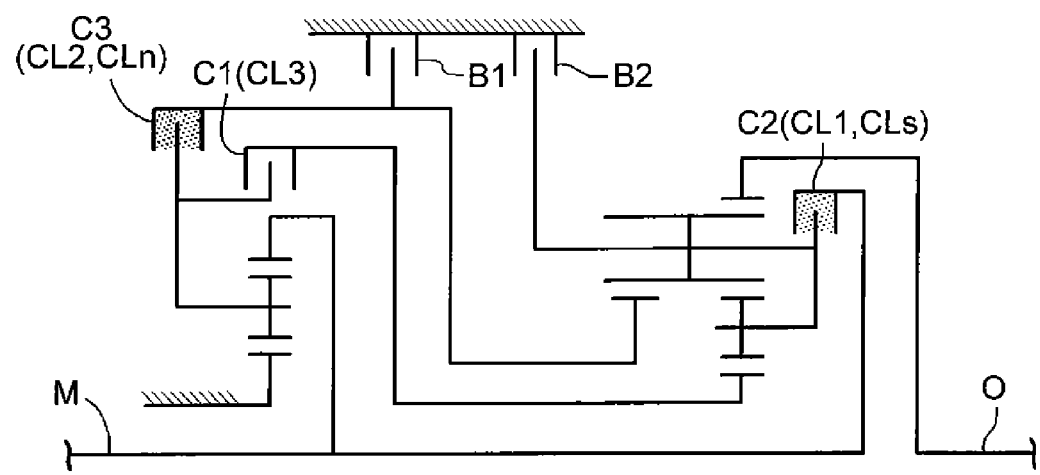
FIG. 7 is a schematic diagram showing the state of the speed change mechanism at the time a fifth speed is formed.

In the present embodiment, it is first assumed that the vehicle is traveling in the electric drive mode with the fifth speed being formed in the speed change mechanism 13. In the present embodiment, as shown in FIGS. 3 and 7, the fifth speed is formed with both a second clutch C2 and a third clutch C3 being in the direct-coupling engaged state and the other shift engagement devices being in the disengaged state. It is herein assumed that in this state, an internal combustion engine start request and a shift request (in this example, a downshift request as a request for shift to a shift speed with a relatively high speed ratio) are received at substantially the same time.

In this assumed example, the fifth speed that has been formed at the start of the internal combustion engine start control and the start slip control associated therewith corresponds to the "reference shift speed" and the "first shift speed" in the present invention. The fourth speed that is one shift speed lower in this assumed example than the fifth speed corresponds to the "specific shift speed" in the present invention, and also corresponds to the "adjoining shift speed" and the "second shift speed." The third speed that is one shift speed lower in this assumed example than the fourth speed corresponds to the "third shift speed" in the present invention. The fourth speed is formed with both the first clutch C1 and the second clutch C2 being in the direct-coupling engaged state, and the third speed is formed with both the first clutch C1 and the third clutch C3 being in the direct-coupling engaged state. In this assumed example, the second clutch C2 corresponds to the "first engagement device CL" in the present invention, the third clutch C3 corresponds to the "second engagement device CL2" in the present invention, and the first clutch C1 corresponds to the "third engagement device CL3" in the present invention.

In the case of normal shift control, when a transition is made from the reference shift speed to the adjoining shift speed (an example of the specific shift speed; the same applies to the following description), the common shift engagement device for forming both of the shift speeds is maintained in the direct-coupling engaged state, and the (non-common) shift engagement device other than the common shift engagement device is disengaged. This shift engagement device that is disengaged is defined as the "normally disengaged engagement device CLn." The shift engagement device that has been in the direct-coupling engaged state in order to form the reference shift speed and that is disengaged when a transition is made to a special shift speed as the shift speed on the opposite side of the adjoining shift speed from the reference shift speed in the order of the speed ratios of the shift speeds (the order of the shift speeds) is defined as the "special engagement device CLs." When looking at the speed ratio of each shift speed, the special shift speed is also a shift speed whose direction of change in speed ratio from the reference shift speed is the same as the adjoining shift speed, and which has a larger difference in speed ratio from the reference shift speed than the adjoining shift speed does. The "order of the speed ratios" can be either the descending order or the ascending order. The special shift speed is also a shift speed for which the third clutch C3 as the normally disengaged engagement device CLn of the reference shift speed is a common engagement device with the reference shift speed. In this assumed example, the third clutch C3 as the second engagement device CL2 is the normally disengaged engagement device CLn, and the second clutch C2 as the first engagement device CL1 is the special engagement device CLs.

A synchronous rotational speed calculating section 43 is a function unit that calculates a synchronous rotational speed Ns as a rotational speed of the shift input shaft M which is determined according to the vehicle speed and the shift speed. Information on the vehicle speed can be derived based on the detection result of the third rotation sensor Se3 (e.g., by proportional computation). The synchronous rotational speed calculating section 43 calculates the synchronous rotational speed Ns proportional to the integrated value of the vehicle speed and the speed ratio predefined for the shift speed formed at that time. Since the vehicle speed is proportional to the rotational speed of the wheels 15 and the rotational speed of the output shaft O, the synchronous rotational speed Ns may be calculated based on one of the vehicle speed, the rotational speed of the wheels 15, and the rotational speed of the output shaft O, and the speed ratio of each shift speed. Such a configuration is substantially the same as the above configuration.

The synchronous rotational speed calculating section 43 calculates at every shift speed the synchronous rotational speed Ns for each shift speed. The synchronous rotational speed Ns at the $n^{th}$ speed is herein referred to as the $n^{th}$ synchronous rotational speed Nsn. The synchronous rotational speed Ns at the reference shift speed is defined as the reference synchronous rotational speed Nsa, the synchronous rotational speed Ns at the adjoining shift speed (specific shift speed) is defined as the adjoining synchronous rotational speed (an example of a specific synchronous rotational speed; the same applies to the following description) Nsb, and the synchronous rotational speed Ns at the special shift speed is defined as the special synchronous rotational speed Nsc. In this assumed example, a fifth synchronous rotational speed Ns5 is the reference synchronous rotational speed Nsa, a fourth synchronous rotational speed Ns4 is the adjoining synchronous rotational speed Nsb, and a third synchronous rotational speed Ns3 is the special synchronous rotational speed Nsc (see also FIGS. 5, 8, and 9).

An intended engagement device deciding section 44 is a function unit that decides the shift engagement device to be brought into the slip engaged state in the start slip control as the intended engagement device CLo. The intended engagement device deciding section 44 decides the intended engagement device CLo based on the vehicle speed and the set determination speed Vj (see FIG. 8 etc.). As described above, the information on the vehicle speed can be derived based on the detection result of the third rotation sensor Se3 (e.g., by proportional computation). The determination speed Vj is a determination threshold for the vehicle speed for selecting the intended engagement device CLo, and is set by a determination speed setting section 45. FIG. 4 shows as an example a form in which the intended engagement device deciding section 44 includes the determination speed setting section 45.

Figure 5:
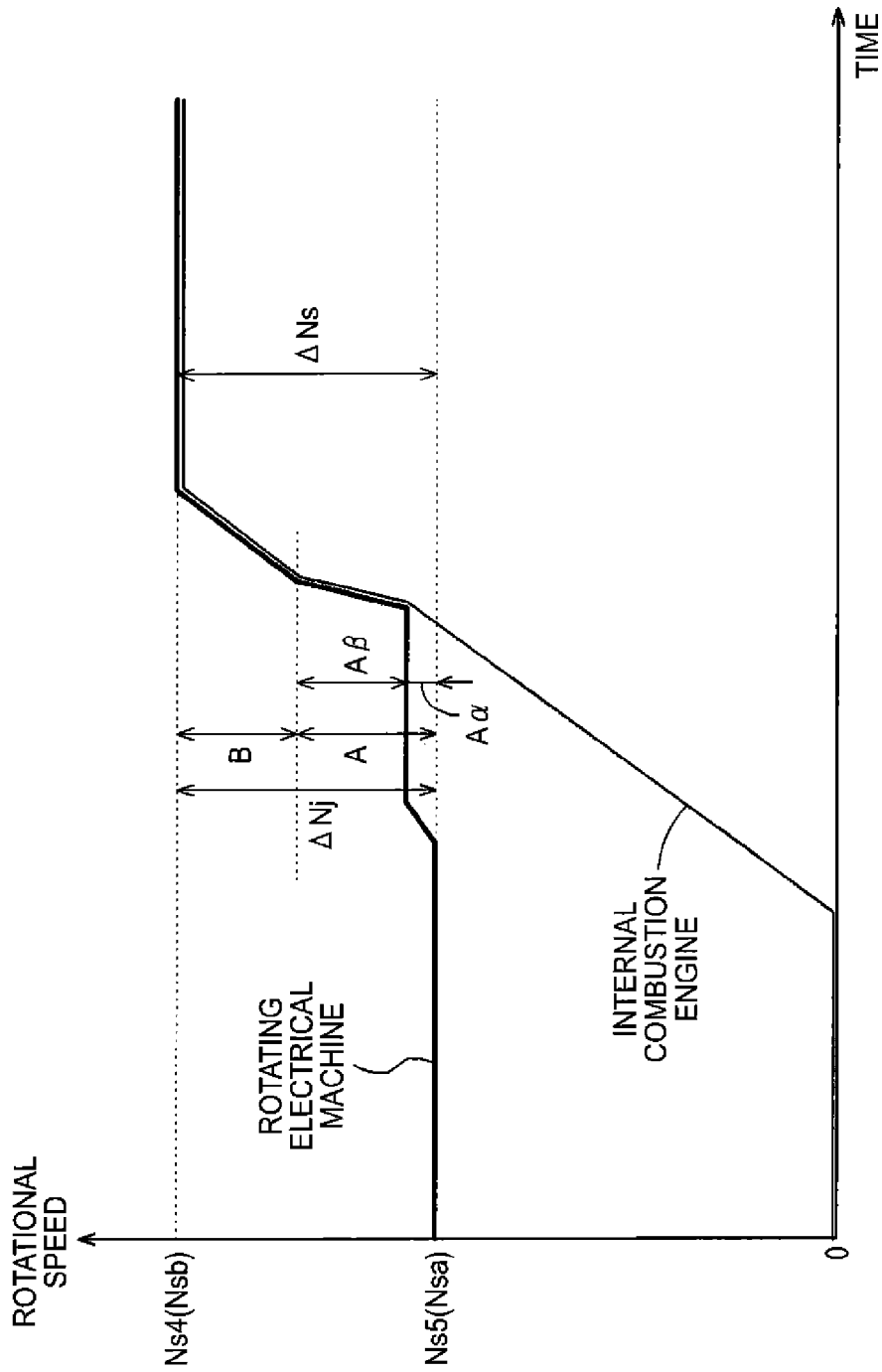
FIG. 5 is an illustration illustrating a method for setting a determination speed.

The determination speed setting section 45 (intended engagement device deciding section 44) sets the determination speed Vj based on the difference $\Delta$Ns between the reference synchronous rotational speed Nsa and the adjoining synchronous rotational speed Nsb and a predetermined determination differential rotational speed $\Delta$Nj. A method for setting the determination speed Vj will be described with reference to FIG. 5. FIG. 5 schematically shows a typical form of change in rotational speeds of the internal combustion engine 11 and the rotating electrical machine 12 which occurs by execution of the internal combustion engine start control. As shown in this figure, the determination differential rotational speed $\Delta$Nj is set based on an increase A in rotational speed of the shift input shaft M from the reference synchronous rotational speed Nsa which is associated with the internal combustion engine start control and a margin B predetermined in view of responsiveness of the shift engagement device when a transition is made from reference shift speed to the adjoining shift speed.

The increase A in rotational speed of the shift input shaft M from the reference synchronous rotational speed Nsa which is associated with the internal combustion engine start control includes a first increase A$\alpha$ based on an active factor due to the control by the control device 3 and a second increase A$\beta$ based on a passive factor due to the start of self-sustained operation of the internal combustion engine 11. During execution of the internal combustion engine start control and the start slip control, the normally disengaged engagement device CLn is appropriately brought into the slip engaged state, and the rotational speed of the internal combustion engine 11 is increased by the torque of the rotating electrical machine 12. Accordingly, the rotational speed control of the rotating electrical machine 12 is executed by using the rotational speed higher than the reference synchronous rotational speed Nsa by a predetermined amount as the target rotational speed. The difference between this target rotational speed and the reference synchronous rotational speed Nsa is the first increase A$\alpha$ based on the active factor. If the self-sustained operation of the internal combustion engine 11 is started and initial explosion torque (torque that is generated upon the initial explosion of mixture in any cylinder of the internal combustion engine 11) is generated, the rotational speed of the rotating electrical machine 12 and the shift input shaft M which rotate in synchronization with the internal combustion engine 11 temporarily rapidly increases. This increase is the second increase A$\beta$ based on the passive factor.

In general, in control of hydraulically driven engagement devices, delay of an actual oil pressure and an engagement pressure in following an oil pressure and an engagement pressure according to the output of an oil pressure command (a certain amount of control delay) is inevitable in view of the realities. Accordingly, when a transition is made from the reference shift speed to the adjoining shift speed, the rotational speed of the shift input shaft M may further increase according to the control delay of the normally disengaged engagement device CLn to be brought from the direct-coupling engaged state to the disengaged state (the third clutch C3 as the second engagement device CL2). This control delay time can be decided quantitatively to some extent. This further increase in rotational speed of the shift input shaft M can be estimated as the integrated value of the control delay time and the rotation acceleration of the internal combustion engine 11 after the starting is started. This estimated increase thus calculated is the margin B predetermined in view of responsiveness of the shift engagement device (in this example, the normally disengaged engagement device CLn). The margin B may be determined also in view of responsiveness of the shift engagement device to be brought from the disengaged state to the direct-coupling engaged state when a transition is made from the reference shift speed to the adjoining shift speed (the first clutch C1 as the third engagement device CL3).

As shown in FIG. 5, in the present embodiment, the determination differential rotational speed $\Delta$Nj is set so as to be equal to the sum of the increase A in rotational speed of the shift input shaft M which is associated with the internal combustion engine start control (the sum of the first increase A$\alpha$ and the second increase A$\beta$) and the margin B determined in view of the responsiveness of the shift engagement device. The determination speed Vj (see FIG. 8 etc.) is set so that the difference $\Delta$Ns between the reference synchronous rotational speed Nsa and the adjoining synchronous rotational speed Nsb is equal to the determination differential rotational speed $\Delta$Nj set as described above. That is, a specific vehicle speed is calculated at which the difference $\Delta$Ns between the reference synchronous rotational speed Nsa and the adjoining synchronous rotational speed Nsb is equal to the determination differential rotational speed ΔNj, and this specific vehicle speed is set as the determination speed Vj.

The reference synchronous rotational speed Nsa and the adjoining synchronous rotational speed Nsb vary according to the speed ratio of the shift speed formed in the speed change mechanism 13, and the difference ΔNs therebetween can also vary accordingly. Since fluidity (viscosity) of oil depends on the oil temperature, responsiveness of the shift engagement device can also vary according to the oil temperature. In view of these, the determination speed setting section 45 (intended engagement device deciding section 44) sets the determination speed Vj to different values according to both the target shift speed (which of the plurality of shift speeds is the reference shift speed) at the time the start slip control is started and the oil temperature at the time the start slip control is started. In the present embodiment, a determination speed defining map (see FIG. 6) is prepared which defines the relation between the oil temperature and target shift speed and the determination speed Vj.

Figure 6:
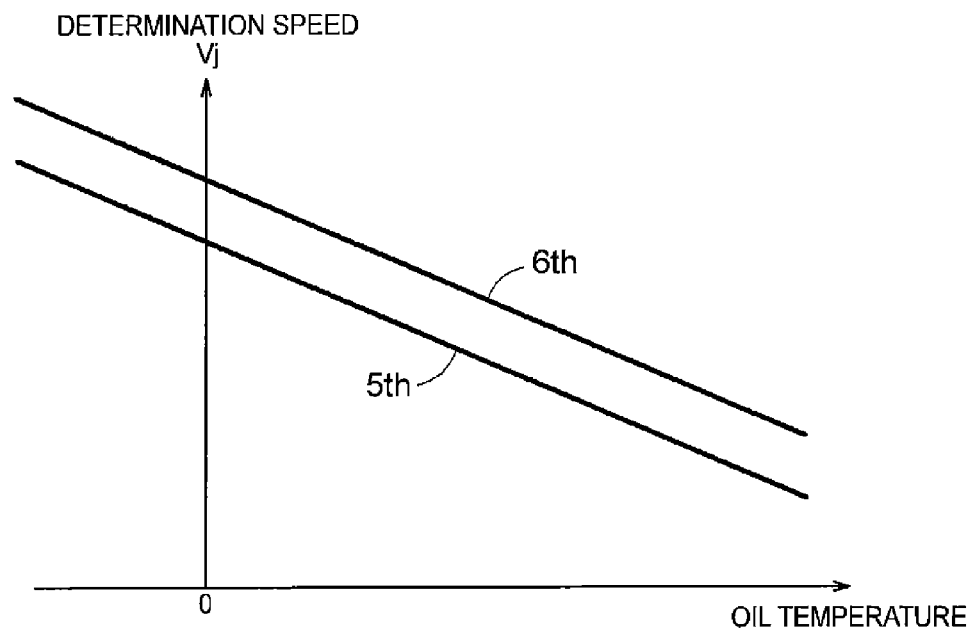
FIG. 6 shows an example of a map defining the relation between the oil temperature and target shift speed and the determination speed.

As shown in FIG. 6, according to the determination speed defining map, the relation between the target shift speed and the determination speed Vj is defined so that the determination speed Vj increases in stages as the target shift speed becomes relatively closer to the high shift speed side. When looking at a specific target shift speed, the relation between the oil temperature and the determination speed Vj is defined so that the determination speed Vj gradually decreases as the oil temperature increases. Such a determination speed defining map is recorded in a storage device such as a memory and is thus provided in the control device 3. The determination speed setting section 45 (intended engagement device deciding section 44) sets the determination speed Vj based on the determination speed defining map and the oil temperature and the target shift speed (reference shift speed) at the time the internal combustion engine start control and the start slip control associated therewith are started.

In the case where the vehicle speed is equal to or higher than the determination speed Vj, the intended engagement device deciding section 44 decides the normally disengaged engagement device CLn to be disengaged when a transition is made to the adjoining shift speed (in this assumed example, the third clutch C3 as the second engagement device CL2) as the intended engagement device CLo. Thus, in the start slip control, the start slip control section 42 brings the normally disengaged engagement device CLn into the slip engaged state while maintaining the special engagement device CLs (in this assumed example, the second clutch C2 as the first engagement device CL1) in the direct-coupling engaged state.

In the case where the vehicle speed is equal to or higher than the determination speed Vj, the difference ΔNs between the reference synchronous rotational speed Nsa and the adjoining synchronous rotational speed Nsb at this vehicle speed is equal or larger than the determination differential rotational speed ΔNj, as is also shown in FIG. 8. Accordingly, even if shifting proceeds in association with the internal combustion engine start control, and the rotational speed of the shift input shaft M increases to some extent, the differential rotational speed equal to or larger than the margin B described above can be ensured up to the point when the rotational speed of the shift input shaft M reaches the adjoining synchronous rotational speed Nsb. Therefore, if the internal combustion engine start control and the shift control from the reference shift speed to the adjoining shift speed are executed at the same time, the shift control from the reference shift speed to the adjoining shift speed can be smoothly executed even in view of the control delay of the normally disengaged engagement device CLn (the third clutch C3 as the second engagement device CL2) to be brought into the disengaged state etc.

Figure 9:
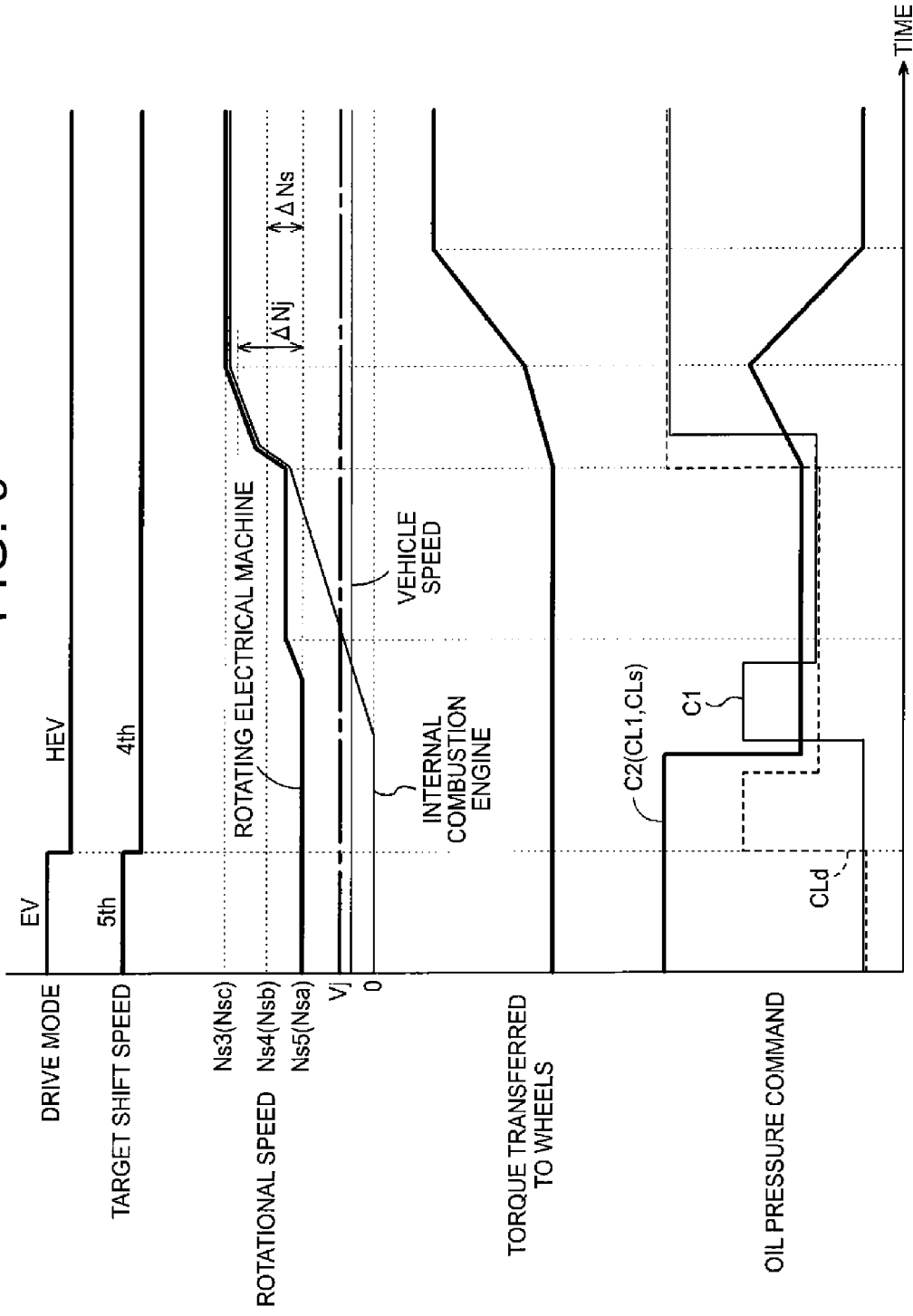
FIG. 9 is a timing chart showing an example of the operating state of each part according to the intended engagement device deciding process.

In the case where the vehicle speed is lower than the determination speed Vj, the difference ΔNs between the reference synchronous rotational speed Nsa and the adjoining synchronous rotational speed Nsb at this vehicle speed is less than the determination differential rotational speed ΔNj, as is also shown in FIG. 9. Accordingly, if it is assumed that the shift control from the reference shift speed to the adjoining shift speed is performed, the increased rotational speed of the shift input shaft M in view of the control delay of the normally disengaged engagement device CLn is higher than the adjoining synchronous rotational speed Nsb. Therefore, in the case where the vehicle speed is lower than the determination speed Vj, the intended engagement device deciding section 44 does not decide the normally disengaged engagement device CLn but decides the special engagement device CLs different from the normally disengaged engagement device CLn as the intended engagement device CLo. That is, the intended engagement device deciding section 44 decides the special engagement device CLs to be disengaged when a transition is made to the special shift speed (in this assumed example, the second clutch C2 as the first engagement device CL1) as the intended engagement device CLo. Thus, in the start slip control, the start slip control section 42 brings the special engagement device CLs into the slip engaged state while maintaining the normally disengaged engagement device CLn in the direct-coupling engaged state.

The difference between the reference synchronous rotational speed Nsa and the special synchronous rotational speed Nsc tends to be equal to or larger than the determination differential rotational speed ΔNj. Accordingly, even if shifting proceeds in association with the internal combustion engine start control and the rotational speed of the shift input shaft M increases to some extent, the differential rotational speed equal to or larger than the margin B described above can be ensured up to the point when the rotational speed of the shift input shaft M reaches the special synchronous rotational speed Nsc. Therefore, if the internal combustion engine start control and the shift control are executed at the same time, the shift control from the reference shift speed to the special shift speed can be smoothly executed even in view of the control delay of the special engagement device CLs (the second clutch C2 as the first engagement device CL1) to be brought into the disengaged state etc.

As described above, the intended engagement device deciding section 44 appropriately decides the intended engagement device CLo from the normally disengaged engagement device CLn and the special engagement device CLs according to the magnitude relation between the vehicle speed and the determination speed Vj. Accordingly, the shift control can be smoothly executed and comfortable traveling performance can be ensured regardless of the vehicle speed. In any case, since slip control for reducing start shock (start slip control) and slip control for shifting (a transition to the adjoining shift speed or the special shift speed) are executed by common control, both the internal combustion engine start control and the shift control can be smoothly and quickly executed.

In the case where the special engagement device CLs is the intended engagement device CLo, the shift speed is forced to be changed to the special shift speed by the shift control even if the changed target shift speed is the adjoining shift speed. In this case, shift control from the special shift speed to the adjoining shift speed can be executed after the internal combustion engine start control is completed. For example, in the configuration in which the first clutch C1 as the third engagement device CL3 is a common clutch for forming the special shift speed and the adjoining shift speed as in this assumed example, the third clutch C3 as the normally disengaged engagement device CLn (second engagement device CL2) is disengaged, and the second clutch C2 as the special engagement device CLs (first engagement device CL1) is engaged (not shown). Alternatively, in the case where the vehicle speed is lower than the determination speed Vj, the shift control may be continued only when the changed target shift speed is the special shift speed, and the shift control may be prohibited otherwise. In this case, the special engagement device CLs as the intended engagement device CLo is preferably returned to the direct-coupling engaged state with completion of the internal combustion engine start control.

Second Assumed Example

Figure 10:
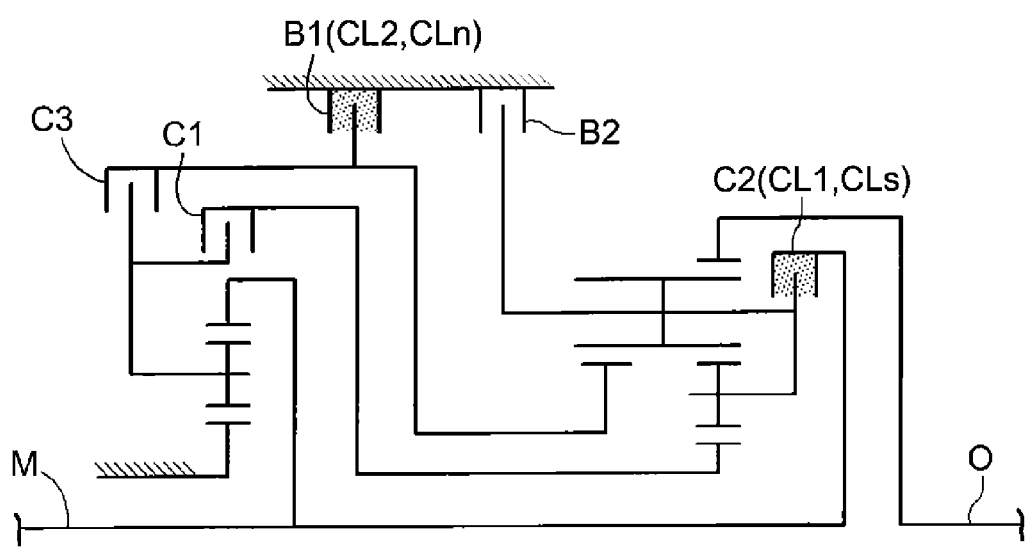
FIG. 10 is a schematic diagram showing the state of the speed change mechanism at the time a sixth speed is formed.

It is now assumed that the vehicle is traveling in the electric drive mode with the sixth speed being formed in the speed change mechanism 13. In the present embodiment, as shown in FIGS. 3 and 10, the sixth speed is formed with both the second clutch C2 and the first brake B1 being in the direct-coupling engaged state and the other shift engagement devices being in the disengaged state. It is herein assumed that in this state, an internal combustion engine start control request and a shift request (in this example, a downshift request) are received substantially at the same time.

Figure 11:
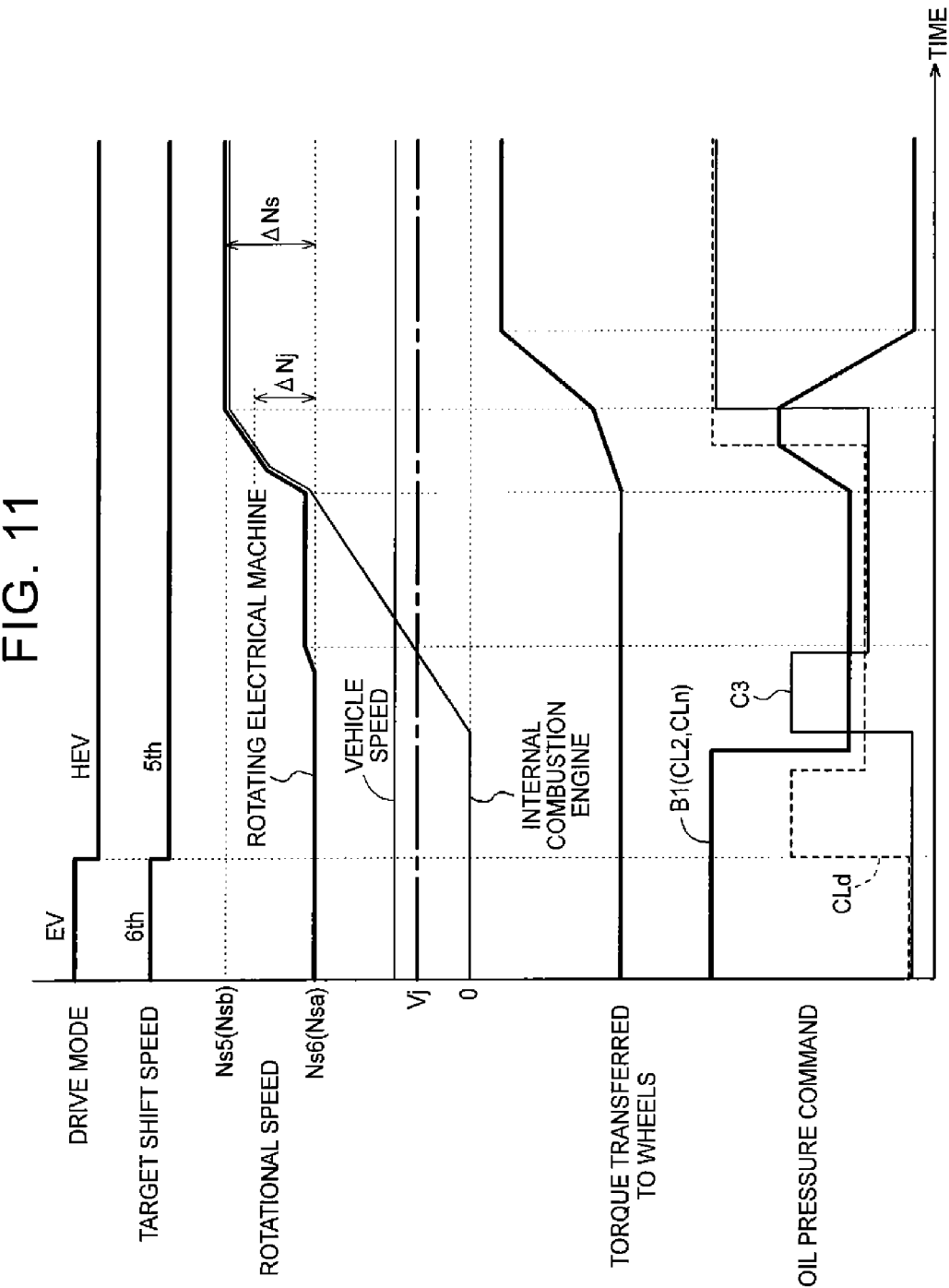
FIG. 11 is a timing chart showing an example of the operating state of each part according to the intended engagement device deciding process.
Figure 12:
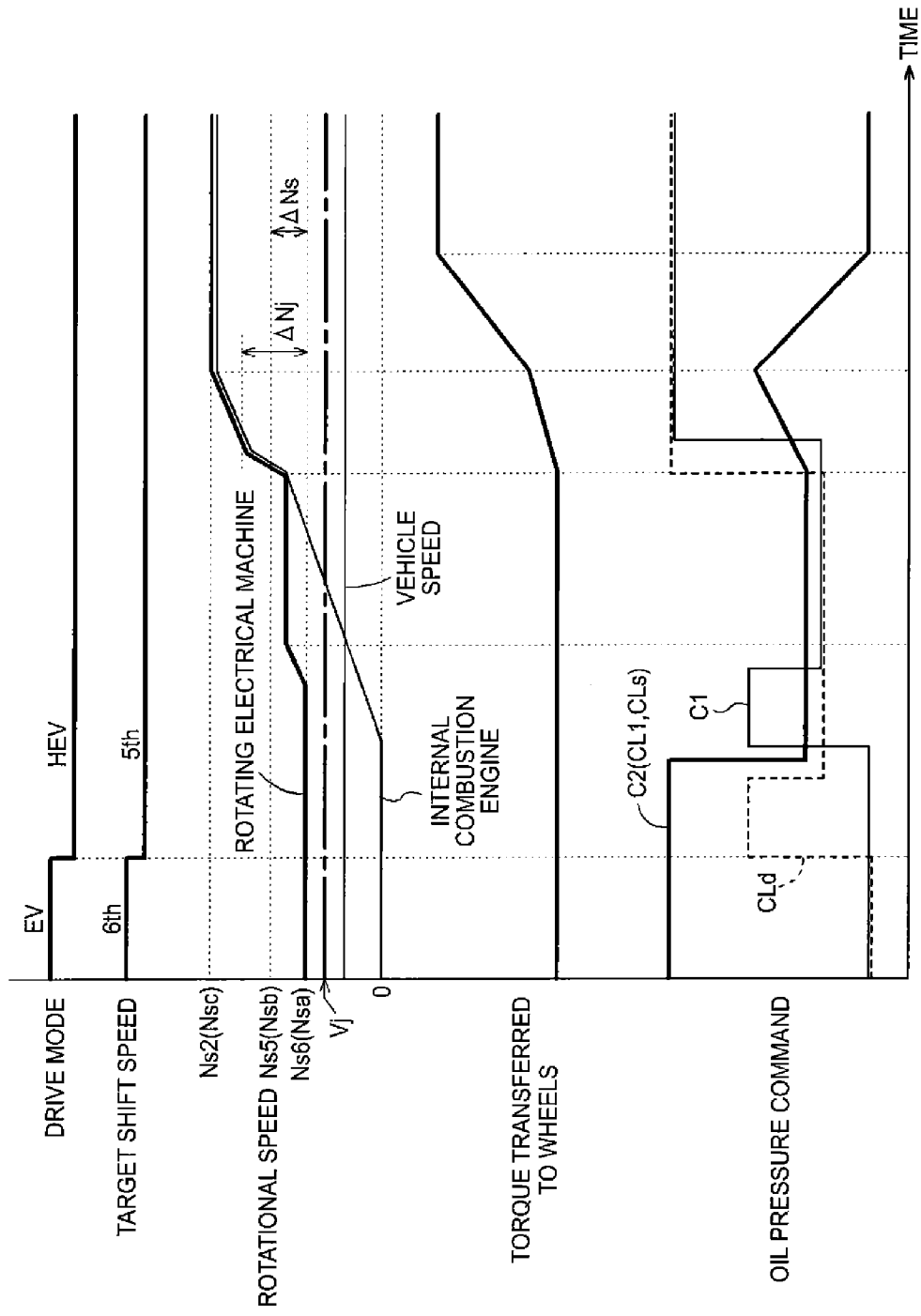
FIG. 12 is a timing chart showing an example of the operating state of each part according to the intended engagement device deciding process.
Figure 16:
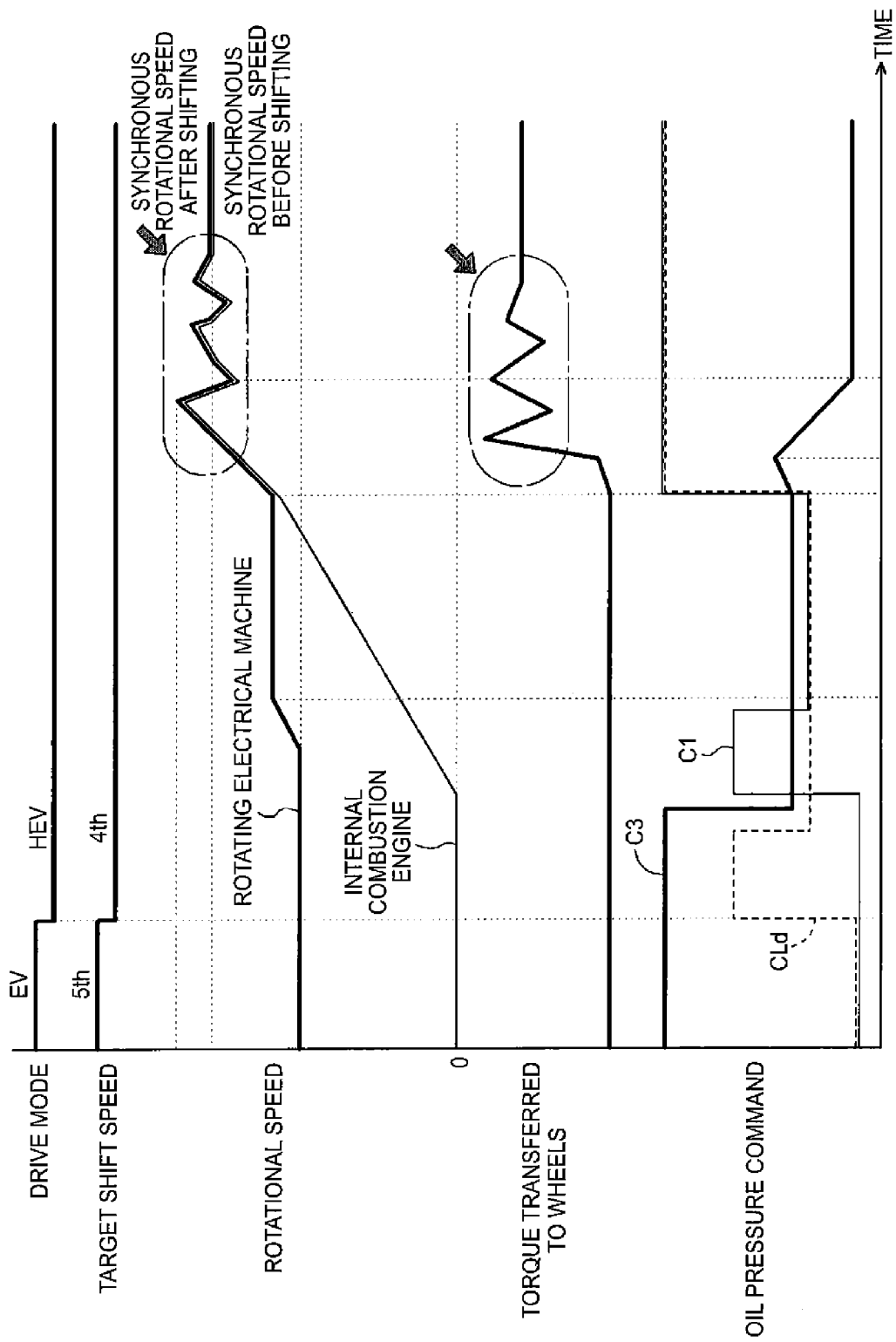
FIG. 16 is a timing chart showing the operating state of each part in a conventional specification.
Figure 17:
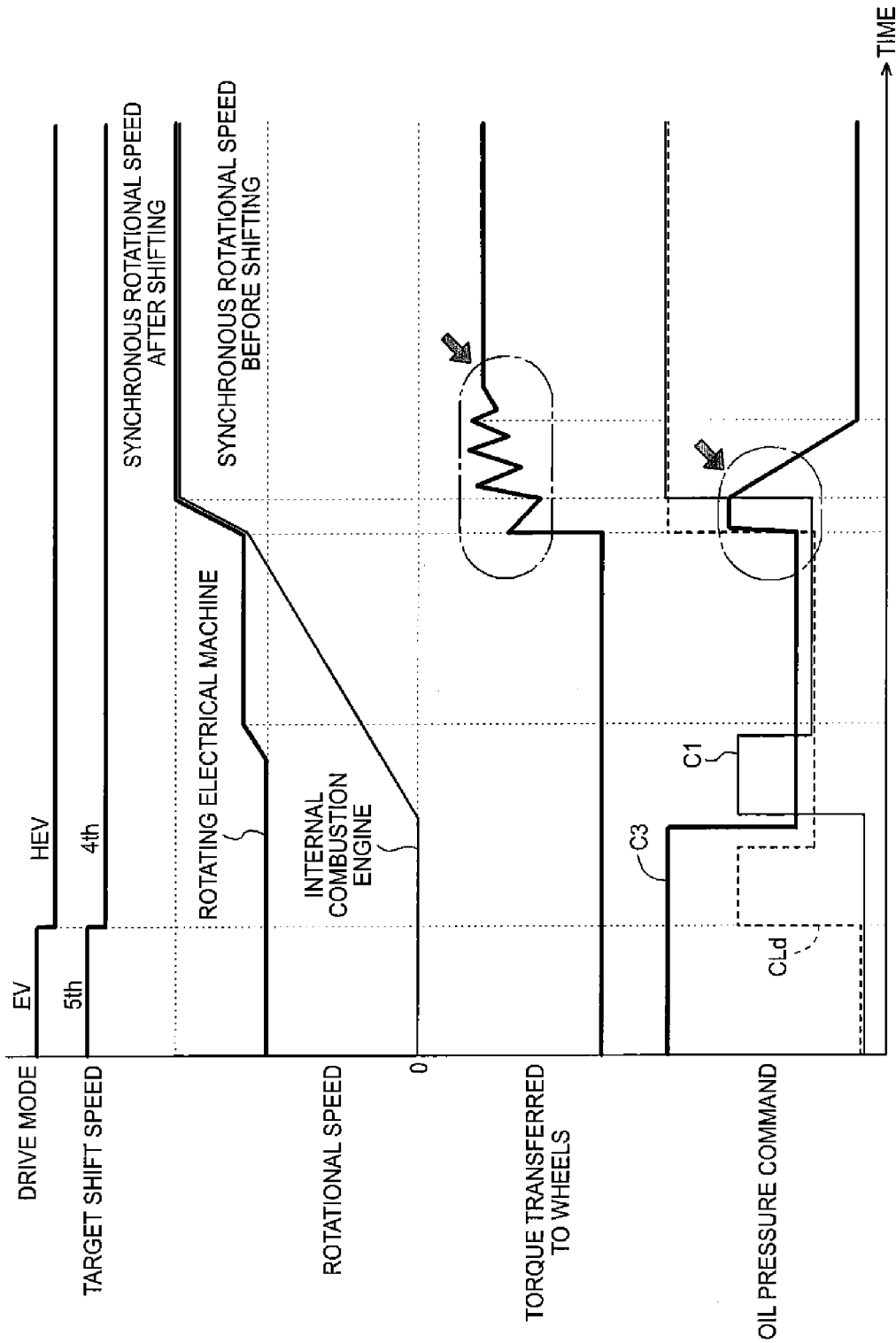
FIG. 17 is a timing chart showing the operating state of each part in a conventional specification.

In this assumed example, the sixth speed formed at the time the internal combustion engine start control and the start slip control associated therewith are started corresponds to the "reference shift speed" and the "first shift speed" in the present invention. The fifth speed that is one shift speed lower in this assumed example than the sixth speed corresponds to the "specific shift speed" in the present invention, and also corresponds to the "adjoining shift speed" and the "second shift speed." The second speed that is a plurality of shift speeds (in this assumed example, three shift speeds) lower in this assumed example than the fifth speed corresponds to the "third speed" in the present invention. A sixth synchronous rotational speed Ns6 is the reference synchronous rotational speed Nsa, and the fifth synchronous rotational speed Ns5 is the adjoining synchronous rotational speed (an example of the specific synchronous rotational speed) Nsb, and a second synchronous rotational speed Ns2 is the special synchronous rotational speed Nsc (see also FIGS. 11 and 12).

The fifth speed is formed with both the second clutch C2 and the third clutch C3 being in the direct-coupling engaged state, and the second sped is formed with both the first clutch C1 and the first brake B1 being in the direct-coupling engaged state. In this assumed example, the second clutch C2 corresponds to the "first engagement device CL1" in the present invention, the first brake B1 corresponds to the "second engagement device CL2" in the present invention, the third clutch C3 corresponds to the "third engagement device CL3" in the present invention, and the first clutch C1 corresponds to the "fourth engagement device CL4" in the present invention. Moreover, in this assumed example, the first brake B1 as the second engagement device CL2 is the normally disengaged engagement device CLn, and the second clutch C2 as the first engagement device CL1 is the special engagement device CLs.

In this assumed example, the reference shift speed is the sixth speed, which is a higher shift speed than the reference shift speed (fifth speed) in the first assumed example. Accordingly, the determination speed setting section 45 (intended engagement device deciding section 44) sets the determination speed Vj higher than that in the first assumed example according to the determination speed defining map of FIG. 6 (see FIG. 11 etc.). The intended engagement device deciding section 44 decides the intended engagement device CLo based on the vehicle speed and the determination speed Vj.

If the vehicle speed is equal to or higher than the determination speed Vj, the intended engagement device deciding section 44 decides the normally disengaged engagement device CLn (in this assumed example, the first brake B as the second engagement device CL2) as the intended engagement device CLo. Thus, in the start slip control, the start slip control section 42 brings the normally disengaged engagement device CLn into the slip engaged state while maintaining the special engagement device CLs (in this assumed example, the second clutch C2 as the first engagement device CL1) in the direct-coupling engaged state. On the other hand, if the vehicle speed is lower than the determination speed Vj, the intended engagement device deciding section 44 decides the special engagement device CLs rather than the normally disengaged engagement device CLn as the intended engagement device CLo. Thus, in the start slip control, the start slip control section 42 brings the special engagement device CLs into the slip engaged state while maintaining the normally disengaged engagement device CLn in the direct-coupling engaged state.

As described above, in this assumed example as well, the intended engagement device deciding section 44 can appropriately decide the intended engagement device CLo from the normally disengaged engagement device CLn and the special engagement device CLs according to the magnitude relation between the vehicle speed and the determination speed Vj. Accordingly, in the case where the internal combustion engine start control and the shift control are executed at the same time, each control can be smoothly and quickly executed while ensuring comfortable traveling performance, regardless of the vehicle speed.

Processing in the case where the changed target shift speed is different from the special shift speed is similar to that of the first assumed example.

3. Procedures of Intended Engagement Device Deciding Process

Procedures of the intended engagement device deciding process according to the present embodiment will be described with reference to the flowchart of FIG. 13.

In the intended engagement device deciding process, information on the target shift speed decided by the target shift speed deciding section 32 is obtained by the determination speed setting section 45 (step #1). Information on the oil temperature detected by the oil temperature sensor Se6 is also obtained by the determination speed setting section 45 (#2). The determination speed Vj is set by the determination speed setting section 45 based on the information on the target shift speed, the information on the oil temperature, and the determination speed defining map (#3). Information on the vehicle speed derived based on the detection result of the third rotation sensor Se3 is obtained by the intended engagement device deciding section 44 (#4). Steps #1 to #4 are repeatedly performed until an internal combustion engine start request is received (#5: No). The information on the target shift speed, the oil temperature, and the vehicle speed is thus successively obtained, and the determination speed Vj is successively updated.

If the internal combustion engine start request is received in this state (#5: Yes), it is determined by the intended engagement device deciding section 44 whether or not the target shift speed (reference shift speed) at that time is an intended shift speed (#6). In the present embodiment, one or more successive shift speeds on the high shift speed side (high speed-side shift speeds) is the intended shift speed. More specifically, the intended shift speed is defined as the shift speed that is formed when the common shift engagement device (in this example, the first clutch C1), which is brought into the direct-coupling engaged state to form two or more successive shift speeds on the low shift speed side (in this example, the first to fourth speeds), is in the disengaged state. In this example, the fifth speed or the sixth speed is the intended shift speed. Accordingly, in this example, it is determined in step #6 by the intended engagement device deciding section 44 whether or not the reference shift speed is the fifth or sixth speed.

If the reference shift speed is not the intended shift speed (#6: No), the normally disengaged engagement device CLn at this reference shift speed is always decided as the intended engagement device CLo regardless of the vehicle speed by the intended engagement device deciding section 44 (#8B). In FIG. 3, "● (black circle)" represents the normally disengaged engagement device CLn at each shift speed. If the reference shift speed is the intended shift speed (#6: Yes), it is determined by the intended engagement device deciding section 44 whether or not the vehicle speed at that time is lower than the determination speed Vj (#7). If the vehicle speed is equal to or higher than the determination speed Vj (#7: No), the normally disengaged engagement device CLn at that reference shift speed is decided as the intended engagement device CLo by the intended engagement device deciding section 44 (#8B). If the vehicle speed is lower than the determination speed Vj (#7: Yes), the special engagement device CLs at that reference shift speed is decided as the intended engagement device CLo by the intended engagement device deciding section 44 (#8A). In FIG. 3, "⊚ (double circle)" represents the special engagement device CLs at each intended shift speed. The intended engagement device deciding process is thus completed.

4. Other Embodiments

Lastly, other embodiments of the control device according to the present invention will be described. Configurations disclosed in each of the following embodiments can be combined with those disclosed in other embodiments as appropriate as long as no consistency arises.

(1) The above embodiment is described with respect to an example in which the control device 3 controls the drive device 1 including the speed change mechanism 13 capable of switching among the six shift speeds. However, embodiments of the present invention are not limited to this. For example, the control device 3 may control the drive device 1 including the speed change mechanism 13 capable of switching among four shift speeds. Since various known configurations can be used as such a speed change mechanism 13, detailed description thereof is omitted, and only an engagement table thereof is shown as an example in FIG. 14. In FIG. 14, "● (black circle)" represents the normally disengaged engagement device CLn at each shift speed, and "⊚ (double circle)" represents the special engagement device CLs at each intended shift speed, as in FIG. 3. In this case as well, the intended engagement device CLo can be appropriately decided based on an idea similar to that of the above embodiment. In particular, in the case where the internal combustion engine start control and the shift control are executed at the same time during traveling at the fourth speed included in the intended shift speed in this example, each control can be smoothly and quickly executed while ensuring comfortable traveling performance, regardless of the vehicle speed.

(2) The control device 3 may also control the drive device 1 including the speed change mechanism 13 capable of switching among eight shift speeds. Since various known configurations can be used as such a speed change mechanism 13, detailed description thereof is omitted, and only an engagement table thereof is shown as an example in FIG. 15. The symbols in FIG. 15 are similar to FIGS. 3 and 14. In this case as well, the intended engagement device CLo can be appropriately decided based on an idea similar to that of the above embodiment. In particular, in the case where the internal combustion engine start control and the shift control are executed at the same time during traveling at the sixth to eighth speeds included in the intended shift speed in this example, each control can be smoothly and quickly executed while ensuring comfortable traveling performance, regardless of the vehicle speed. The number of shift speeds that can be switched is not limited to 4, 6, and 8, and may be any value equal to or larger than 3.

(3) The above embodiment is described with respect to an example in which the determination speed setting section 45 sets the determination speed Vj based on both the reference shift speed and the oil temperature at the time the start slip control is started. However, embodiments of the present invention are not limited to this. For example, in the case where the shift engagement devices are configured as electromagnetic engagement devices etc., responsiveness of the shift engagement devices can be substantially constant. Accordingly, in such a case, it is also preferable that the determination speed setting section 45 set the determination speed Vj based only on the reference shift speed. For example, in the case of controlling the drive device 1 including the speed change mechanism 13 capable of switching among the four shift speeds as described with reference to FIG. 14, the reference shift speed that can be the intended shift speed is limited to one. Accordingly, in such a case, it is also preferable that the determination speed setting section 45 set the determination speed Vj based only on the oil temperature. Alternatively, the determination speed setting section 45 may set the determination speed Vj based also on other indices such as the amount of electricity stored in the electricity storage device 25.

(4) The above embodiment is described with respect to an example in which the determination speed setting section 45 sets the determination differential rotational speed ΔNj based on the increase A in rotational speed of the shift input shaft M which is associated with the internal combustion engine start control, and the predetermined margin B. The above embodiment is also described with respect to an example in which the determination speed setting section 45 sets the margin B according to the rotation acceleration of the internal combustion engine 11 after the starting is started. However, embodiments of the present invention are not limited to this. For example, the determination speed setting section 45 may always set the margin B and the determination differential rotational speed ΔNj to the same values.

(5) The above embodiment is described with respect to an example in which the rotor of the rotating electrical machine 12 always rotate together with the shift input shaft M in the drive device 1 that is controlled by the control device 3. However, embodiments of the present invention are not limited to this. For example, the drive device 1 may include a fluid coupling (e.g., torque converter) having a fastening engagement device, a dedicated transmission engagement device, etc. between the rotating electrical machine 12 and the speed change mechanism 13, and the rotor of the rotating electrical machine 12 may be drivingly coupled to the shift input shaft M via these elements. The drive device 1 having such a configuration may be controlled by the control device 3.

(6) The above embodiment is described with respect to an example in which the adjoining shift speed that adjoins the reference shift speed on the low shift speed side (that is one shift speed lower than the reference shift speed) is the specific shift speed, and the shift engagement device that is disengaged when shifting from the reference shift speed to the adjoining shift speed is the normally disengaged engagement device CLn. However, embodiments of the present invention are not limited to this. That is, the reference shift speed and the specific shift speed need not necessarily adjoin each other, and any other shift speed may be interposed therebetween in the order of the speed ratios. The drive device 1 including the speed change mechanism 13 having such a configuration may be controlled by the control device 3.

(7) The above embodiment is described with respect to an example in which the control device 3 includes the function units 31 to 45. However, embodiments of the present invention are not limited to this. The assignment of the function units described above is by way of example only. A plurality of function units may be combined, and a single function unit may be subdivided.

(8) Regarding other configurations as well, the embodiments disclosed in the specification are by way of example only in all respects, and embodiments of the present invention are not limited to them. Those configurations which are not described in the claims of the present application may be modified as appropriate without departing from the object of the present invention.

INDUSTRIAL APPLICABILITY

The present invention can be used for control devices that control a vehicle drive device in which a disconnecting engagement device, a rotating electrical machine, and a speed change mechanism are provided in this order from an internal combustion engine toward wheels on a power transmission path connecting the internal combustion engine and the wheels, such as, e.g., a drive device for single-motor parallel hybrid vehicles.

DESCRIPTION OF THE REFERENCE NUMERALS

1: Drive Device (Vehicle Drive Device)
3: Control Device
11: Internal Combustion Engine
12: Rotating Electrical Machine
13: Speed Change Mechanism
15: Wheel
41: Start Control Section
42: Start Slip Control Section
44: Intended Engagement Device Deciding Section
M: Shift Input Shaft (Input-Side Rotating Member)
C1: First Clutch (Shift Engagement Device)
C2: Second Clutch (Shift Engagement Device)
C3: Third Clutch (Shift Engagement Device)
B1: First Brake (Shift Engagement Device)
B2: Second Brake (Shift Engagement Device)
CL1: First Engagement Device
CL2: Second Engagement Device
CL3: Third Engagement Device
CL4: Fourth Engagement Device
CLn: Normally Disengaged Engagement Device
CLs: Special Engagement Device
CLo: Intended Engagement Device
Vj: Determination Speed
ΔNj: Determination Differential Rotational Speed
Nsa: Reference Synchronous Rotational Speed
Nsb: Adjoining Synchronous Rotational Speed (Specific Synchronous Rotational Speed)
Nsc: Special Synchronous Rotational Speed
ΔNs: Difference between Reference Synchronous Rotational Speed and Adjoining Synchronous Rotational Speed (Specific Synchronous Rotational Speed)
A: Increase in Rotational Speed of Shift Input Shaft Associated with Internal Combustion Engine Start Control
B: Margin

The invention claimed is:

1. A control device for a vehicle drive device in which a disconnecting engagement device, a rotating electrical machine, and a speed change mechanism are provided in this order from an internal combustion engine toward wheels on a power transmission path connecting the internal combustion engine and the wheels, and in which the speed change mechanism is capable of switching between or among a plurality of shift speeds by controlling an engagement state of each of a plurality of shift engagement devices included in the speed change mechanism, comprising:

a start control section that executes internal combustion engine start control of bringing the disconnecting engagement device from a disengaged state to a direct-coupling engaged state and starting the internal combustion engine in a stopped state;

a start slip control section that executes start slip control of bringing one of the plurality of shift engagement devices into a slip engaged state at least when the disconnecting engagement device is direct-coupling engaged in the internal combustion engine start control; and an intended engagement device deciding section that decides as an intended engagement device the shift engagement device to be brought into the slip engaged state in the start slip control, wherein the intended engagement device deciding section operates based on a set determination speed so that when a vehicle speed is equal to or higher than the determination speed, the intended engagement device deciding section decides as the intended engagement device a normally disengaged engagement device that is the shift engagement device having been in the direct-coupling engaged state in order to form a reference shift speed at start of the start slip control, and that is disengaged when a transition is made from the reference shift speed to a predetermined specific shift speed, and when the vehicle speed is lower than the determination speed, the intended engagement device deciding section decides as the intended engagement device a special engagement device that is the shift engagement device having been in the direct-coupling engaged state in order to form the reference shift speed, and that is disengaged when a transition is made to a special shift speed on an opposite side of the specific shift speed from the reference shift speed in order of speed ratios of the plurality of shift speeds, a rotational speed of an input-side rotating member of the speed change mechanism which is determined according to the vehicle speed and the shift speed is a synchronous rotational speed, the intended engagement device deciding section sets the determination speed based on a difference between a reference synchronous rotational speed as the synchronous rotational speed at the reference shift speed and a specific synchronous rotational speed as the synchronous rotational speed at the specific shift speed, and a predetermined determination differential rotational speed that is set based on an increase in the rotational speed of the input-side rotating member from the reference synchronous rotational speed that is associated with the internal combustion engine start control, and the intended engagement device deciding section sets as the determination speed a specific vehicle speed at which the difference is equal to the predetermined determination differential rotational speed.

2. The control device for the vehicle drive device according to claim 1, wherein the intended engagement device deciding section sets the determination speed to different values according to which one of the plurality of shift speeds is the reference shift speed.

3. The control device for the vehicle drive device according to claim 1, wherein the predetermined determination differential rotational speed is also set based on a margin predetermined in view of responsiveness of the shift engagement device when a transition is made from the reference shift speed to the specific shift speed.

4. The control device for the vehicle drive device according to claim 3, wherein the margin is set according to rotation acceleration of the internal combustion engine after starting of the internal combustion engine is started.

5. The control device for the vehicle drive device according to claim 1, wherein the shift engagement device is a hydraulically driven engagement device, and the intended engagement device deciding section sets the determination speed to different values according to an oil temperature at the start of the start slip control.

6. The control device for the vehicle drive device according to claim 1, wherein the speed change mechanism is capable of switching among a first shift speed that is formed by bringing at least a first engagement device and a second engagement device into the direct-coupling engaged state, a second shift speed that is formed by bringing at least the first engagement device and a third engagement device into the direct-coupling engagement state and that is a shift speed lower than the first shift speed, and a third shift speed that is formed by bringing at least the second engagement device and the third engagement device or a fourth engagement device into the direct coupling engagement state and that is a shift speed lower than the second shift speed, and the reference shift speed is the first shift speed, the specific shift speed is the second shift speed, the normally disengaged engagement device is the second engagement device, and the special engagement device is the first engagement device.

7. The control device for the vehicle drive device according to claim 1, wherein the specific shift speed is an adjoining shift speed adjoining the reference shift speed on a low shift speed side.

* * * * *